US006859689B2

(12) United States Patent
Vos

(10) Patent No.: US 6,859,689 B2
(45) Date of Patent: Feb. 22, 2005

(54) METHOD, APPARATUS AND DESIGN PROCEDURE FOR CONTROLLING MULTI-INPUT, MULTI-OUTPUT (MIMO) PARAMETER DEPENDENT SYSTEMS USING FEEDBACK LTI'ZATION

(75) Inventor: David W. Vos, Delaplane, VA (US)

(73) Assignee: Athena Technologies, Inc., Warrenton, VA (US)

( * ) Notice: Subject to any disclaimer, the term of this patent is extended or adjusted under 35 U.S.C. 154(b) by 0 days.

(21) Appl. No.: 10/351,436

(22) Filed: Jan. 27, 2003

(65) Prior Publication Data

US 2003/0191561 A1 Oct. 9, 2003

Related U.S. Application Data

(63) Continuation of application No. 09/580,587, filed on May 30, 2000, now Pat. No. 6,539,290.

(51) Int. Cl.[7] .......................... G06K 9/40; G06F 17/00; B64C 13/00
(52) U.S. Cl. .............................. 701/4; 701/11; 244/196
(58) Field of Search ............................ 701/3, 4, 11, 14, 701/15, 18; 244/196, 181, 182, 177, 3.21, 17.3, 76 R; 708/5, 6, 801

(56) References Cited

U.S. PATENT DOCUMENTS 3,848,833 A * 11/1974 Rauschelbach ............. 244/177

3,927,306 A * 12/1975 Miller ........................ 701/15

(List continued on next page.)

FOREIGN PATENT DOCUMENTS

DE       39 29 404 A1    3/1991

OTHER PUBLICATIONS

Textbook entitled "Aircraft Dynamics and Automatic Control", chapter 4 entitled "Elementary Theory of Nonlinear Feedback for Single–Input Single–Output Systems".
"Application of Nonlinear Transformations to Automatic Flight Control" by G. Meyer, R. Su, and L.R. Hunt.

*Primary Examiner*—Tan Q. Nguyen
*Assistant Examiner*—Dalena Tran
(74) *Attorney, Agent, or Firm*—Finnegan, Henderson, Farabow, Garrett & Dunner, LLP

(57) ABSTRACT

A method and apparatus are provided for controlling a dynamic device having multi-inputs and operating in an environment having multiple operating parameters. A method of designing flight control laws using multi-input, multi-output feedback LTI'zation is also provided. The method includes steps of: (i) determining coordinates for flight vehicle equations of motion; (ii) transforming the coordinates for the flight vehicle equations of motion into a multi-input linear time invariant system; (iii) establishing control laws yielding the transformed equations of motion LTI; (iv) adjusting the control laws to obtain a desired closed loop behavior for the controlled system; and (v) converting the transformed coordinates control laws to physical coordinates.

25 Claims, 30 Drawing Sheets

U.S. PATENT DOCUMENTS

| | | | |
|---|---|---|---|
| 4,115,847 A | 9/1978 | Osder et al. | 364/101 |
| 4,217,486 A | 8/1980 | Tawfik et al. | 371/68 |
| 4,308,521 A | 12/1981 | Casasent et al. | 340/146 |
| 4,373,184 A | 2/1983 | Lambregts | 364/434 |
| 4,536,843 A | 8/1985 | Lambregts | 364/434 |
| 4,644,538 A | 2/1987 | Cooper et al. | 364/434 |
| 4,649,484 A | 3/1987 | Herzog et al. | 364/434 |
| 4,872,116 A * | 10/1989 | Ito et al. | 701/41 |
| 4,980,835 A | 12/1990 | Lawrence et al. | 364/434 |
| 5,001,646 A | 3/1991 | Caldwell et al. | 364/434 |
| 5,016,177 A | 5/1991 | Lambregts | 364/424 |
| 5,025,381 A | 6/1991 | Goodzeit et al. | 364/434 |
| 5,274,554 A | 12/1993 | Takats et al. | 364/424.03 |
| 5,289,377 A | 2/1994 | Yokote et al. | 364/424.04 |
| 5,297,052 A | 3/1994 | McIntyre et al. | 364/434 |
| 5,379,210 A * | 1/1995 | Grujic et al. | 700/28 |
| 5,446,666 A | 8/1995 | Bauer | 364/434 |
| 5,493,497 A | 2/1996 | Buus | 364/434 |
| 5,581,665 A | 12/1996 | Sugiura et al. | 395/86 |
| 5,581,666 A | 12/1996 | Anderson | 395/98 |
| 5,615,119 A | 3/1997 | Vos | 701/4 |
| 5,631,830 A * | 5/1997 | Schroeder | 701/4 |
| 5,819,188 A | 10/1998 | Vos | 701/4 |
| 6,014,598 A | 1/2000 | Duyar et al. | 701/34 |
| 6,085,127 A | 7/2000 | Vos | 701/4 |
| 6,115,654 A | 9/2000 | Eid et al. | 701/34 |
| 6,122,577 A | 9/2000 | Mergenthaler et al. | 701/34 |

* cited by examiner

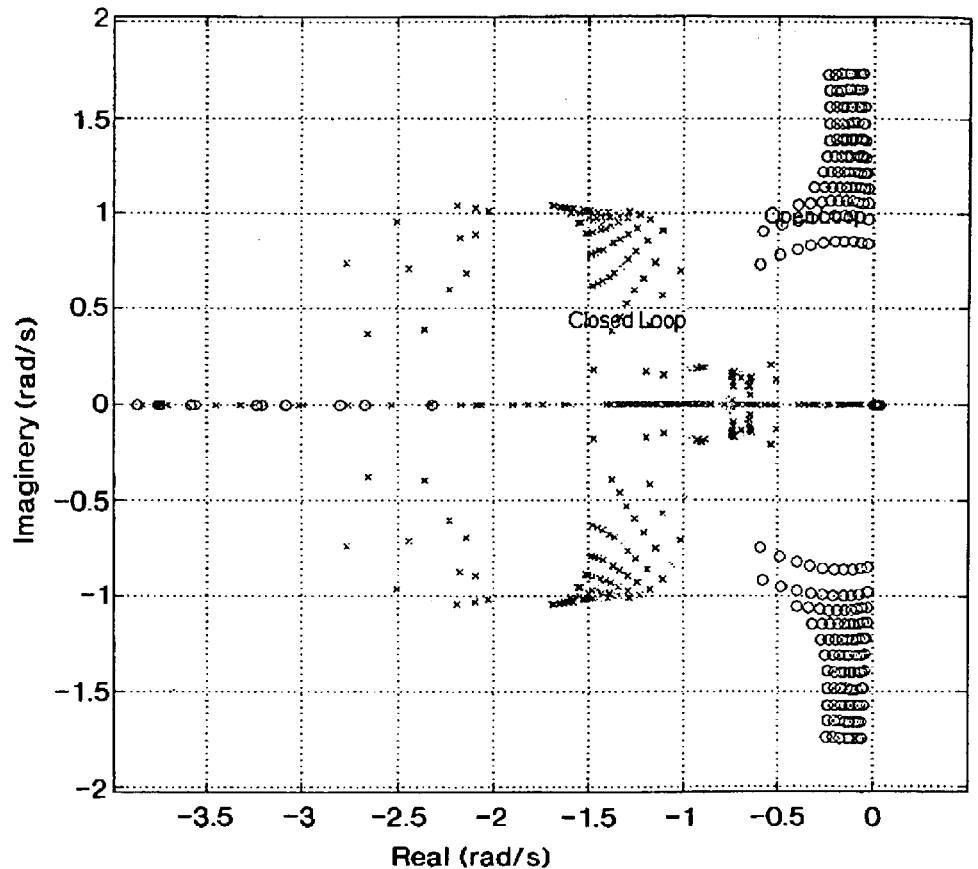

S-plane root loci for closed loop and open loop lateral dynamics over the entire flight envelope from 20 m/s to 47m/s IAS, and sea level to 22km altitude, at the discrete density and dynamic pressure values in the lookup tables. Open loop poles are circles, and closed loop poles are crosses. Closed loop poles all lie inside the 45 degree sector from the origin about the negative real axis, which is the design criterion for good damping characteristics. Also note that closed loop modal frequency magnitudes are not increased significantly over the open loop values. This reduces danger of actuator saturation in normal envelope operation, as well as phase delays due to too high closed loop modes for the sample period of 60ms.

FIG. 6

```
HIDDEN GainTableType g_ail_beta = {
  {245,355.5,466,576.5,687,797.5,908,1018.5,1129,1239.5,1350},
/* q in [Pa] */
  {0.0645,0.0895,0.1241,0.1721,0.2387,0.3310,0.4591,0.6368,0.8832,1.2249},
[kg/m^3]  */
  {6.2943959e-001, 4.7013513e-001, 3.8689512e-001, 3.2714920e-001, 2.8009280e-001,
2.4041387e-001, 2.0521951e-001, 1.7279718e-001, 1.4205970e-001, 1.1227291e-001,
8.2911763e-002,
   6.3150408e-001, 4.7527693e-001, 3.9422328e-001, 3.3588414e-001, 2.8984375e-001,
2.5094891e-001, 2.1638513e-001, 1.8448399e-001, 1.5418569e-001, 1.2477435e-001,
9.5737857e-002,
   6.3193292e-001, 4.7966097e-001, 4.0136887e-001, 3.4474843e-001, 2.9990618e-001,
2.6190305e-001, 2.2803013e-001, 1.9667826e-001, 1.6682415e-001, 1.3777621e-001,
1.0903937e-001,
   6.2965997e-001, 4.8249053e-001, 4.0769710e-001, 3.5317724e-001, 3.0973990e-001,
2.7273522e-001, 2.3959690e-001, 2.0879556e-001, 1.7935696e-001, 1.5062190e-001,
1.2211793e-001,
   6.2315625e-001, 4.8258587e-001, 4.1223250e-001, 3.6027785e-001, 3.1847486e-001,
2.8256446e-001, 2.5017322e-001, 2.1987950e-001, 1.9077508e-001, 1.6224415e-001,
1.3384447e-001,
   6.1028122e-001, 4.7825297e-001, 4.1353399e-001, 3.6470498e-001, 3.2478382e-001,
2.9003858e-001, 2.5835652e-001, 2.2846165e-001, 1.9953470e-001, 1.7101816e-001,
1.4251013e-001,
   5.8812392e-001, 4.6714001e-001, 4.0955471e-001, 3.6452052e-001, 3.2674023e-001,
2.9319004e-001, 2.6210866e-001, 2.3241640e-001, 2.0341379e-001, 1.7462150e-001,
1.4569149e-001,
   5.5287403e-001, 4.4611571e-001, 3.9751719e-001, 3.5706917e-001, 3.2169667e-001,
2.8931997e-001, 2.5864848e-001, 2.2886570e-001, 1.9943241e-001, 1.6997346e-001,
1.4021200e-001,
   4.9980605e-001, 4.1124175e-001, 3.7387175e-001, 3.3894150e-001, 3.0626262e-001,
2.7499868e-001, 2.4448243e-001, 2.1424609e-001, 1.8396205e-001, 1.5339168e-001,
1.2235042e-001,
   4.2351965e-001, 3.5796577e-001, 3.3445918e-001, 3.0615141e-001, 2.7651989e-001,
2.4633469e-001, 2.1573888e-001, 1.8471737e-001, 1.5321510e-001, 1.2116685e-001,
8.8502943e-002}
};
```

FIG. 19

```
/* These tables are used in Theseus and for Perseus 004 11/97 */

HIDDEN GainTableType g_ail_p = ( (245,355.5,466,576.5,687,797.5,908,1018.5,1129,1239.5,1350),
/* q in [Pa] */
   (0.0645,0.0895,0.1241,0.1721,0.2387,0.3310,0.4591,0.6368,0.8832,1.2249),   /*
[kg/m^3] */
   (3.1016161e-001,  1.9080754e-001,  1.3099526e-001,  1.0014516e-001,  8.2358571e-002,
7.1464578e-002,  6.4592890e-002,  6.0243359e-002,  5.7565226e-002,  5.6046155e-002,
5.5363328e-002,
      2.6131156e-001,  1.4864659e-001,  9.3598216e-002,  6.6188437e-002,  5.1008806e-002,
4.2165493e-002,  3.6950727e-002,  3.3965823e-002,  3.2426921e-002,  3.1867754e-002,
3.1998348e-002,
      2.1102842e-001,  1.0491703e-001,  5.4816558e-002,  3.1063458e-002,  1.8699444e-002,
1.2099781e-002,  8.7185991e-003,  7.2600278e-003,  7.0088954e-003,  7.5467871e-003,
8.6181996e-003,
      1.6182356e-001,  6.1625548e-002,  1.6450598e-002,  -3.5382965e-003, -1.2939509e-002,
-1.7137883e-002, -1.8528435e-002, -1.8308525e-002, -1.7126098e-002, -1.5351907e-002, -
1.3206587e-002,
      1.1758610e-001,  2.1909698e-002, -1.8685928e-002, -3.4987007e-002, -4.1392811e-002,
-4.3107972e-002, -4.2402958e-002, -4.0389293e-002, -3.7654067e-002, -3.4523572e-002, -
3.1185079e-002,
      8.3998487e-002, -9.6260246e-003,  -4.6473758e-002, -5.9458362e-002, -6.3035174e-002,
-6.2329927e-002, -5.9535956e-002, -5.5703354e-002, -5.1371669e-002, -4.6830236e-002, -
4.2237243e-002,
      6.8892400e-002, -2.6639782e-002, -6.1272273e-002, -7.1769479e-002, -7.3016554e-002,
-7.0215075e-002, -6.5556140e-002, -6.0068211e-002, -5.4265795e-002, -4.8414529e-002, -
4.2651537e-002,
      8.2314625e-002, -2.1057354e-002, -5.5985260e-002, -6.5515247e-002, -6.5471729e-002,
-6.1349634e-002, -5.5445490e-002, -4.8824487e-002, -4.2009734e-002, -3.5263458e-002, -
2.8714355e-002,
       1.3585654e-001,  1.6250987e-002, -2.2785738e-002, -3.3874393e-002, -3.4418461e-002,
-3.0486938e-002, -2.4623332e-002, -1.8007399e-002, -1.1216365e-002, -4.5369243e-003,
1.8929196e-003,
      2.4051480e-001,  9.3497646e-002,  4.4935624e-002,  2.8397150e-002,  2.4183660e-002,
2.5327609e-002,  2.8871222e-002,  3.3426495e-002,  3.8306265e-002,  4.3164324e-002,
4.7830291e-002)
);
```

FIG. 20

```
HIDDEN GainTableType g_ail_r = {

```
HIDDEN GainTableType g_ail_phi = {

```
HIDDEN GainTableType g_ail_beta_integrator = {
   {245,355.5,466,576.5,687,797.5,908,1018.5,1129,1239.5,1350},
/* q in [Pa] */
   {0.0645,0.0895,0.1241,0.1721,0.2387,0.3310,0.4591,0.6368,0.8832,1.2249},   /*
[kg/m^3]  */
   (2.3538e-001, 2.7034e-001, 2.8996e-001, 3.0137e-001, 3.0862e-001, 3.1345e-001,
3.1676e-001, 3.1903e-001, 3.2057e-001, 3.2157e-001, 3.2217e-001,
    2.3868e-001, 2.7417e-001, 2.9427e-001, 3.0606e-001, 3.1362e-001, 3.1872e-001,
3.2226e-001, 3.2474e-001, 3.2646e-001, 3.2763e-001, 3.2837e-001,
    2.4262e-001, 2.7858e-001, 2.9915e-001, 3.1130e-001, 3.1916e-001, 3.2450e-001,
3.2825e-001, 3.3091e-001, 3.3279e-001, 3.3409e-001, 3.3496e-001,
    2.4733e-001, 2.8364e-001, 3.0462e-001, 3.1707e-001, 3.2517e-001, 3.3071e-001,
3.3462e-001, 3.3740e-001, 3.3937e-001, 3.4075e-001, 3.4167e-001,
    2.5296e-001, 2.8938e-001, 3.1065e-001, 3.2330e-001, 3.3153e-001, 3.3716e-001,
3.4111e-001, 3.4391e-001, 3.4588e-001, 3.4723e-001, 3.4810e-001,
    2.5969e-001, 2.9583e-001, 3.1717e-001, 3.2982e-001, 3.3799e-001, 3.4352e-001,
3.4735e-001, 3.4999e-001, 3.5179e-001, 3.5294e-001, 3.5361e-001,
    2.6773e-001, 3.0297e-001, 3.2401e-001, 3.3633e-001, 3.4415e-001, 3.4930e-001,
3.5272e-001, 3.5495e-001, 3.5631e-001, 3.5703e-001, 3.5725e-001,
    2.7729e-001, 3.1070e-001, 3.3091e-001, 3.4239e-001, 3.4940e-001, 3.5375e-001,
3.5638e-001, 3.5782e-001, 3.5840e-001, 3.5834e-001, 3.5781e-001,
    2.8854e-001, 3.1885e-001, 3.3740e-001, 3.4736e-001, 3.5292e-001, 3.5590e-001,
3.5721e-001, 3.5738e-001, 3.5674e-001, 3.5552e-001, 3.5387e-001,
    3.0162e-001, 3.2705e-001, 3.4288e-001, 3.5037e-001, 3.5369e-001, 3.5458e-001,
3.5396e-001, 3.5233e-001, 3.5000e-001, 3.4720e-001, 3.4407e-001)
};
```

FIG. 23

```
HIDDEN GainTableType g_ail_phi_integrator = {

```
HIDDEN GainTableType g_rudder_beta = (

```
HIDDEN GainTableType g_rudder_p = {

```
HIDDEN GainTableType g_rudder_r = {

```
HIDDEN GainTableType g_rudder_phi = {
  {245,355.5,466,576.5,687,797.5,908,1018.5,1129,1239.5,1350},
/* q in [Pa] */
  {0.0645,0.0895,0.1241,0.1721,0.2387,0.3310,0.4591,0.6368,0.8832,1.2249},  /*
[kg/m^3] */
  {-2.6604039e-001, -2.3340552e-001, -2.1858029e-001, -2.0801432e-001, -2.0153513e-
001, -1.9803660e-001, -1.9671960e-001, -1.9706133e-001, -1.9871945e-001, -2.0146676e-
001, -2.0515149e-001,
    -2.5887537e-001, -2.3590815e-001, -2.2297591e-001, -2.1344019e-001, -2.0776809e-
001, -2.0498246e-001, -2.0433124e-001, -2.0531588e-001, -2.0760865e-001, -2.1099205e-
001, -2.1532123e-001,
    -2.6575848e-001, -2.4947964e-001, -2.3615153e-001, -2.2633318e-001, -2.2068653e-
001, -2.1813034e-001, -2.1784288e-001, -2.1928723e-001, -2.2211425e-001, -2.2609412e-
001, -2.3107486e-001,
    -2.9545137e-001, -2.8039827e-001, -2.6283479e-001, -2.5054154e-001, -2.4361141e-
001, -2.4046847e-001, -2.4002624e-001, -2.4160498e-001, -2.4477420e-001, -2.4925519e-
001, -2.5486550e-001,
    -3.6082487e-001, -3.3777502e-001, -3.0979638e-001, -2.9151279e-001, -2.8120279e-
001, -2.7616436e-001, -2.7473133e-001, -2.7591285e-001, -2.7910050e-001, -2.8390802e-
001, -2.9008511e-001,
    -4.8057035e-001, -4.3467326e-001, -3.8660043e-001, -3.5683928e-001, -3.3988945e-
001, -3.3092679e-001, -3.2720832e-001, -3.2716659e-001, -3.2986344e-001, -3.3471301e-
001, -3.4133878e-001,
    -6.8154063e-001, -5.8958329e-001, -5.0654975e-001, -4.5691236e-001, -4.2836194e-
001, -4.1240726e-001, -4.0445609e-001, -4.0195249e-001, -4.0339357e-001, -4.0785206e-
001, -4.1473556e-001,
    -1.0019487e+000, -8.2832780e-001, -6.8783708e-001, -6.0566570e-001, -5.5809632e-
001, -5.3060359e-001, -5.1556016e-001, -5.0879005e-001, -5.0786690e-001, -5.1130653e-
001, -5.1816535e-001,
    -1.4958635e+000, -1.1865524e+000, -9.5495453e-001, -8.2141452e-001, -7.4389868e-
001, -6.9825262e-001, -6.7200903e-001, -6.5841331e-001, -6.5357387e-001, -6.5512658e-
001, -6.6157536e-001,
    -2.2400809e+000, -1.7132928e+000, -1.3406533e+000, -1.1279947e+000, -
1.0046405e+000, -9.3137275e-001, -8.8815286e-001, -8.6420294e-001, -8.5335584e-001, -
8.5188883e-001, -8.5745867e-001}
};
```

FIG. 28

```
HIDDEN GainTableType g_rudder_beta_int = ( (245,355.5,466,576.5,687,797.5,908,1018.5,1129,1239.5,1350},
/* q in (Pa) */
    (0.0645,0.0895,0.1241,0.1721,0.2387,0.3310,0.4591,0.6368,0.8832,1.2249),    /*
[kg/m^3]  */
    (3.9018e-001,  5.3736e-001,  6.2083e-001,  6.7154e-001,  7.0411e-001,  7.2586e-001,
7.4072e-001, 7.5100e-001, 7.5809e-001, 7.6290e-001, 7.6602e-001,
    3.8633e-001,  5.3230e-001,  6.1610e-001,  6.6706e-001,  6.9964e-001,  7.2121e-001,
7.3577e-001, 7.4567e-001, 7.5234e-001, 7.5671e-001, 7.5939e-001,
    3.8203e-001,  5.2651e-001,  6.1071e-001,  6.6198e-001,  6.9458e-001,  7.1592e-001,
7.3012e-001, 7.3957e-001, 7.4575e-001, 7.4959e-001, 7.5174e-001,
    3.7731e-001,  5.1996e-001,  6.0463e-001,  6.5628e-001,  6.8888e-001,  7.0996e-001,
7.2372e-001, 7.3263e-001, 7.3821e-001, 7.4144e-001, 7.4296e-001,
    3.7227e-001,  5.1267e-001,  5.9789e-001,  6.4995e-001,  6.8253e-001,  7.0328e-001,
7.1651e-001, 7.2477e-001, 7.2965e-001, 7.3215e-001, 7.3295e-001,
    3.6713e-001,  5.0471e-001,  5.9054e-001,  6.4304e-001,  6.7555e-001,  6.9586e-001,
7.0843e-001, 7.1592e-001, 7.1996e-001, 7.2160e-001, 7.2154e-001,
    3.6228e-001,  4.9629e-001,  5.8271e-001,  6.3561e-001,  6.6794e-001,  6.8765e-001,
6.9939e-001, 7.0591e-001, 7.0895e-001, 7.0958e-001, 7.0854e-001,
    3.5838e-001,  4.8773e-001,  5.7458e-001,  6.2772e-001,  6.5964e-001,  6.7850e-001,
6.8914e-001, 6.9448e-001, 6.9629e-001, 6.9572e-001, 6.9353e-001,
    3.5657e-001,  4.7961e-001,  5.6644e-001,  6.1939e-001,  6.5045e-001,  6.6803e-001,
6.7719e-001, 6.8097e-001, 6.8126e-001, 6.7925e-001, 6.7570e-001,
    3.5873e-001,  4.7277e-001,  5.5853e-001,  6.1041e-001,  6.3979e-001,  6.5535e-001,
6.6239e-001, 6.6410e-001, 6.6243e-001, 6.5861e-001, 6.5342e-001)
);
```

FIG. 29

```
HIDDEN GainTableType g_rudder_phi_int = {
  (245,355.5,466,576.5,687,797.5,908,1018.5,1129,1239.5,1350),
  /* q in [Pa] */

(0.0645,0.0895,0.1241,0.1721,0.2387,0.3310,0.4591,0.6368,0.8832,1.2249),   /*
  [kg/m^3] */
    (-1.0610728e-001, -5.9702674e-002, -4.1811410e-002, -3.2390830e-002, -2.6839304e-
  002, -2.3331825e-002, -2.1031263e-002, -1.9507317e-002, -1.8518650e-002, -1.7920578e-
  002, -1.7621869e-002,
       -1.1219525e-001, -6.3657519e-002, -4.4718392e-002, -3.4760044e-002, -2.8875200e-
  002, -2.5129358e-002, -2.2642084e-002, -2.0963523e-002, -1.9842270e-002, -1.9127793e-
  002, -1.8725108e-002,
       -1.2040864e-001, -6.8968242e-002, -4.8629844e-002, -3.7954342e-002, -3.1622938e-
  002, -2.7555921e-002, -2.4816033e-002, -2.2927908e-002, -2.1626999e-002, -2.0755110e-
  002, -2.0212294e-002,
       -1.3152302e-001, -7.6130919e-002, -5.3913517e-002, -4.2276395e-002, -3.5344432e-
  002, -3.0843783e-002, -2.7761931e-002, -2.5589921e-002, -2.4045909e-002, -2.2961569e-
  002, -2.2230352e-002,
       -1.4659991e-001, -8.5828008e-002, -6.1074000e-002, -4.8141045e-002, -4.0398916e-
  002, -3.5312089e-002, -3.1767443e-002, -2.9211382e-002, -2.7339110e-002, -2.5968810e-
  002, -2.4985092e-002,
       -1.6708333e-001, -9.8994120e-002, -7.0800429e-002, -5.6114446e-002, -4.7277334e-
  002, -4.1398133e-002, -3.7228059e-002, -3.4153695e-002, -3.1839561e-002, -3.0085762e-
  002, -2.8765009e-002,
       -1.9491441e-001, -1.1689726e-001, -8.4026330e-002, -6.6964197e-002, -5.6647343e-
  002, -4.9699077e-002, -4.4686450e-002, -4.0915405e-002, -3.8009229e-002, -3.5743715e-
  002, -3.3975503e-002,
       -2.3264922e-001, -1.4123080e-001, -1.0200127e-001, -8.1722681e-002, -6.9412733e-
  002, -6.1029013e-002, -5.4887904e-002, -5.0186453e-002, -4.6492514e-002, -4.3549180e-
  002, -4.1191397e-002,
       -2.8353876e-001, -1.7420249e-001, -1.2637368e-001, -1.0176967e-001, -8.6797097e-
  002, -7.6503654e-002, -6.8865933e-002, -6.2934765e-002, -5.8203948e-002, -5.4372857e-
  002, -5.1247330e-002,
       -3.5147965e-001, -2.1859557e-001, -1.5929170e-001, -1.2895560e-001, -1.1048074e-
  001, -9.7686336e-002, -8.8095333e-002, -8.0565554e-002, -7.4493508e-002, -6.9520997e-
  002, -6.5415282e-002)
  );
```

FIG. 30

METHOD, APPARATUS AND DESIGN PROCEDURE FOR CONTROLLING MULTI-INPUT, MULTI-OUTPUT (MIMO) PARAMETER DEPENDENT SYSTEMS USING FEEDBACK LTI'ZATION

This application is a continuation of application Ser. No. 09/580,587, filed May 30, 2000, now U.S. Pat. No. 6,539,290, incorporated herein by reference.

BACKGROUND OF THE INVENTION

I. Field of the Invention

The present invention relates to a method of designing control laws (e.g., flight control laws in an airplane) by applying a technique called Multi-Input, Multi-Output (MIMO) feedback LTI'zation, which is applicable to solving a feedback control design problem for a class of nonlinear and linear parameter dependent ("LPD") dynamic systems, also known as linear parameter varying ("LPV"), with multiple inputs and multiple outputs. Feedback LTI'zation combines a co-ordinates transformation and a feedback control law, the results of which cancel system parameter dependent terms and yield the transformed space open loop system linear time invariant (LTI). The present invention further relates to using multi-input feedback LTI'zation to solve the control design problem associated with control systems for LPD dynamic devices. In particular, the invention is applied to a feedback control system for controlling a parameter dependent dynamic device (e.g., an airplane) with multiple control inputs.

II. Background

Design techniques used for solving feedback control design problems can be divided into several classes. For example, two broad classes are (1) Linear Time Invariant systems (herein after referred to as "LTI") and (2) nonlinear systems. In the last four decades, LTI systems have received a great deal of attention resulting in many well-defined control design techniques. See, e.g., Maciejowski, J. M., Multivariable Feedback Design, 1989, Addison-Wesley and Reid, J. G., Linear System Fundamentals, 1983, McGraw-Hill, each incorporated herein by reference. Nonlinear systems have, in contrast, received far less attention. Consequently, a smaller set of techniques has been developed for use in feedback control system design for nonlinear systems or linear parameter dependent systems. As a result, control law design for nonlinear systems can be an arduous task. Typically, control laws consist of a plurality of equations used to control a dynamic device in a desirable and predictable manner. Previously, designing control laws for LPD systems using quasi-static LTI design techniques could require an enormous amount of effort, often entailing weeks, if not months, of time to complete a single full envelope design. For example, when designing a flight control law, designers must predict and then design the control law to accommodate a multitude (often thousands) of operating points within the flight envelope (i.e., the operating or performance limits for an aircraft).

Feedback Linearization (reference may be had to Isidori, A., Nonlinear Control Systems, 2nd Edition, 1989, Springer-Verlag, herein incorporated by reference), is applicable to control design for a broad class of nonlinear systems, but does not explicitly accommodate system parameter changes at arbitrary rates. Feedback LTI'zation, a technique used for rendering a control system model linear time invariant, for single input systems is outlined in the Ph.D. thesis of the inventor, Dr. David W. Vos, "Non-linear Control Of An Autonomous Unicycle Robot; Practical Issues," Massachusetts Institute of Technology, 1992, incorporated herein by reference. This thesis extends Feedback Linearization to explicitly accommodate fast parameter variations. However, the Ph.D. thesis does not give generally applicable solutions or algorithms for applying feedback LTI'zation to either single input or multi-input parameter dependent dynamic systems. U.S. Pat. No. 5,615,119 (herein incorporated by reference, and hereafter the "'119"patent) addressed this problem, albeit in the context of failure detection filter design. In particular, the '119 patent describes a fault tolerant control system including (i) a coordinate transforming diffeomorphism and (ii) a feedback control law, which produces a control system model that is linear time invariant (a feedback control law which renders a control system model linear time invariant is hereinafter termed "a feedback LTI'ing control law").

The '119 patent encompasses fault detection and isolation and control law reconfiguration by transforming various actuator and sensor signals into a linear time invariant coordinate system within which an LTI failure detection filter can be executed, to thus provide a capability for failure detection and isolation for dynamic systems whose parameters vary over time. That is, a detection filter may be implemented in a so-called Z-space in which the system may be represented as linear time invariant and is independent of the dynamic system parameters.

What is needed, however, is the further extension of the feedback LTIzation control law principals in the '119 patent to multi-input parameter dependent systems. Furthermore, control system designers have long experienced a need for a fast and efficient method of designing control laws relating to parameter dependent nonlinear systems. An efficient method of control law design is therefore needed. Similarly, there is also a need for a control system aimed at controlling such a dynamic device with multiple control inputs.

SUMMARY OF THE INVENTION

The present invention specifically solves a Multi-Input feedback LTI'zation problem, and shows a method for feedback control law design for a parameter dependent dynamic device (e.g., an airplane) class of systems. Additionally, the present invention provides a control system for controlling a parameter dependent dynamic device with multiple inputs. The present invention is also applicable to the methods and systems discussed in the above-mentioned '119 patent (i.e., for failure detection system design in the multi-input case). As a result of the concepts of this invention, control system designers may now shave weeks or months off of their design time.

According to one aspect of the invention, an automatic control system for controlling a dynamic device is provided. The device includes sensors and control laws stored in a memory. The control system includes a receiving means for receiving status signals (measuring the state vector) and current external condition signals (measuring parameter values) from the sensors, and for receiving reference signals. Also included is processing structure for: (i) selecting and applying gain schedules to update the control laws, wherein the gain schedules correspond to the current external conditions signals (parameter values) and are generated in a multi-input linear time invariant coordinates system; (ii) determining parameter rates of change and applying the parameter rates of change to update the control laws; (iii) applying device status signal feedback to update the control laws; and (iv) controlling the device based on the updated control laws.

According to another aspect of the invention, a method for designing flight control laws using multi-input parameter dependent feedback is provided. The method includes the following steps: (i) determining a coordinates system for flight vehicle equations of motion; (ii) transforming the coordinates system for the flight vehicle equations of motion into a multi-input linear time invariant system; (iii) establishing control criteria yielding the transformed coordinates equations of motion LTI; (iv) adjusting the control criteria to obtain a desired closed loop behavior for the controlled system; and (v) converting the transformed coordinates control laws to physical coordinates.

According to still another aspect of the invention, a method of controlling a dynamic device is provided. The device including actuators, sensors and control laws stored in a memory. The method includes the following steps: (i) transforming device characteristics into a multi-input linear time invariant system; (ii) selecting and applying physical gain schedules to the control laws, the gain schedules corresponding to the current external condition signals; (iii) determining and applying parameter rates of change to update the control laws; (iv) applying device status signal feedback to update the control laws; (v) converting the transformed coordinates control laws to physical coordinates; and (vi) controlling the device based on the updated control laws.

Specific computer executable software stored on a computer or processor readable medium is also another aspect of the present invention. This software code for developing control laws for dynamic devices includes: (i) code to transform device characteristics into a multi-input linear time invariant system; (ii) code to establish control criteria yielding the transformed coordinates equations of motion LTI; (iii) code to define a design point in the multi-input LTI; (iv) code to adjust the transformations to correspond with the design point; and (v) code to develop a physical coordinates control law corresponding to the adjusted transformations; and (vi) code to apply reverse transformations to cover the full design envelope.

In yet another aspect of the present invention, a multi-input parameter dependent control system for controlling an aircraft is provided. The system includes receiving means for receiving aircraft status signals and for receiving current external condition signals. A memory having at least one region for storing computer executable code is also included. A processor for executing the program code is provided, wherein the program code includes code to: (i) transform the aircraft characteristics into a multi-input linear time invariant system; (ii) select and apply gain schedules to flight control laws, the gain schedules corresponding to the current external condition signals; (iii) determine parameter rates of change, and to apply the parameter rates of change to the flight control laws; (iv) apply feedback from the aircraft status signals to the flight control laws; (v) convert the transformed coordinates control laws to physical coordinates; and (vi) control the aircraft based on the updated flight control laws.

BRIEF DESCRIPTION OF THE DRAWINGS

The present invention will be more readily understood from a detailed description of the preferred embodiments taken in conjunction with the following figures.

FIG. 6 is an S-plane root loci plot for the closed and open loop lateral dynamics according to the present invention.

FIGS. 19–30 are numerical gain lookup tables according to the present invention.

DETAILED DESCRIPTION OF THE PREFERRED EMBODIMENTS

Figure 1:
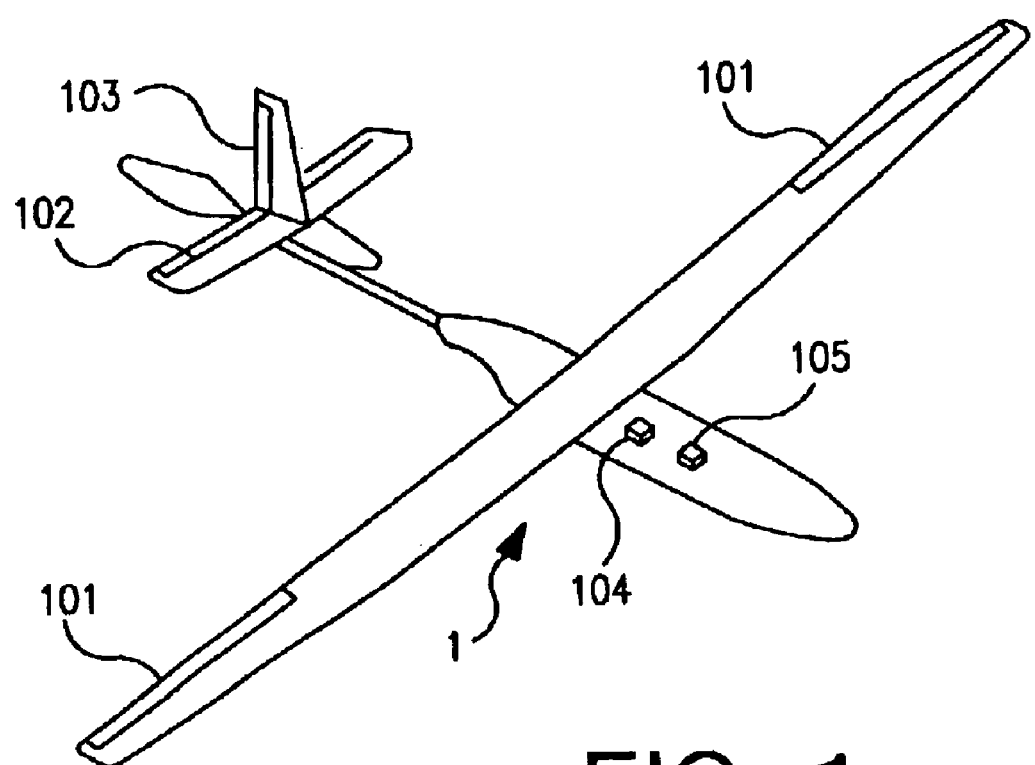
FIG. 1 is a perspective view of an aircraft incorporating an automatic control system of the present invention.

Described herein is a technique called Multi-Input Feedback ("FBK") LTI'zation, which is applicable to solving feedback control design problems for a class of nonlinear and linear parameter dependent systems with multiple inputs such as actuator commands. This technique accommodates arbitrary changes and rates of change of system parameters, such as air density and dynamic pressure. As will be appreciated by one of ordinary skill in the art, a subset of nonlinear systems, namely linear parameter dependent (herein after referred to as "LPD") systems, is one method of modeling real world dynamic systems. Control design for such systems is traditionally achieved using LTI (linear time invariant) design techniques at a number of fixed parameter values (operating conditions), where at each operating condition the system's equations of motion become LTI. Gain scheduling by curve fitting between these design points, is then used to vary the gains as the operating conditions vary. Feedback LTI'zation gives a simple and fast method for full envelope control design, covering any parameter value. In addition, the resulting gain schedules (as discussed below) are an automatic product of this design process, and the closed loop system can be shown to be stable for the full parameter envelope and for arbitrary rates of variation of the system parameters throughout the operating envelope, using these gain schedules and the feedback LTI'ing control law.

The process of applying Feedback LTI'zation to facilitate designing control laws involves several steps, including: (i) transforming the coordinates of equations of motion of a dynamic device (e.g., an airplane) into a so-called z-space; (ii) defining a control law which yields the transformed coordinates equations of motion linear time invariant (LTI); and (iii) applying LTI design techniques to the transformed coordinates mathematical model to yield a desired closed loop behavior for the controlled system, all as discussed below. The third step is achieved by (a) designing the feedback gains in physical coordinates at a selected operating condition; (b) using the coordinates transformations to map these gains into z-space; and (c) reverse mapping via the coordinates transformations and Feedback LTI'ing control laws to determine physical coordinates control laws for operating conditions other than at the design conditions.

One aspect of the present invention will be described with respect to an aircraft automatic flight control system for maintaining desired handling qualities and dynamic performance of the aircraft. However, the present invention is also applicable to other dynamic devices, such as vehicles including automobiles, trains, and robots; and to other dynamic systems requiring monitoring and control. Furthermore, the present invention encompasses a design method and system for designing control laws by, for example, defining a point in z-space, and then updating a system transformation to generate control laws in x-space (i.e., in physical coordinates).

FIG. 1 is a perspective view of an aircraft 1 having flight control surfaces such as ailerons 101, elevator 102, and rudder 103. For example, aircraft 1 is a Perseus 004 unmanned aircraft operated by Aurora Flight Science, Inc. of Manassas, Va. Each flight control surface has an actuator (not shown in FIG. 1) for controlling the corresponding surface to achieve controlled flight. Of course, other flight control actuators may be provided such as throttle, propeller pitch, fuel mixture, trim, brake, cowl flap, etc.

The actuators described above are controlled by a flight control computer 104 which outputs actuator control signals in accordance with one or more flight control algorithms (hereinafter termed "flight control laws") in order to achieve controlled flight. As expected, the flight control computer 104 has at least one processor for executing the flight control laws, and/or for processing control software or algorithms for controlling flight. Also, the flight computer may have a storage device, such as Read-Only Memory ("ROM"), Random Access Memory ("RAM"), and/or other electronic memory circuits.

The flight control computer 104 receives as inputs sensor status signals from the sensors disposed in sensor rack 105. Various aircraft performance sensors disposed about the aircraft monitor and provide signals to the sensor rack 105, which in turn, provides the sensor signals to the flight control computer 104. For example, provided aircraft sensors may include: an altimeter; an airspeed probe; a vertical gyro for measuring roll and pitch attitudes; rate gyros for measuring roll, pitch, and yaw angular rates; a magnetometer for directional information; alpha-beta air probes for measuring angle of attack and sideslip angle; etc. As will be appreciated, if a roll rate sensor is not included in the sensor suite or rack 105, a roll rate signal may be synthesized by using the same strategy as would be used if an onboard roll rate sensor failed in flight. Meaning that the roll rate signal is synthesized by taking the discrete derivative of the roll attitude (bank angle) signal. The manipulation (i.e., taking the discrete derivative) of the bank angle signal may be carried out by software running on the flight computer 104. Thus, using sensor status inputs, control algorithms, and RAM look-up tables, the flight control computer 104 generates actuator output commands to control the various flight control surfaces to maintain stable flight.

Figure 2:
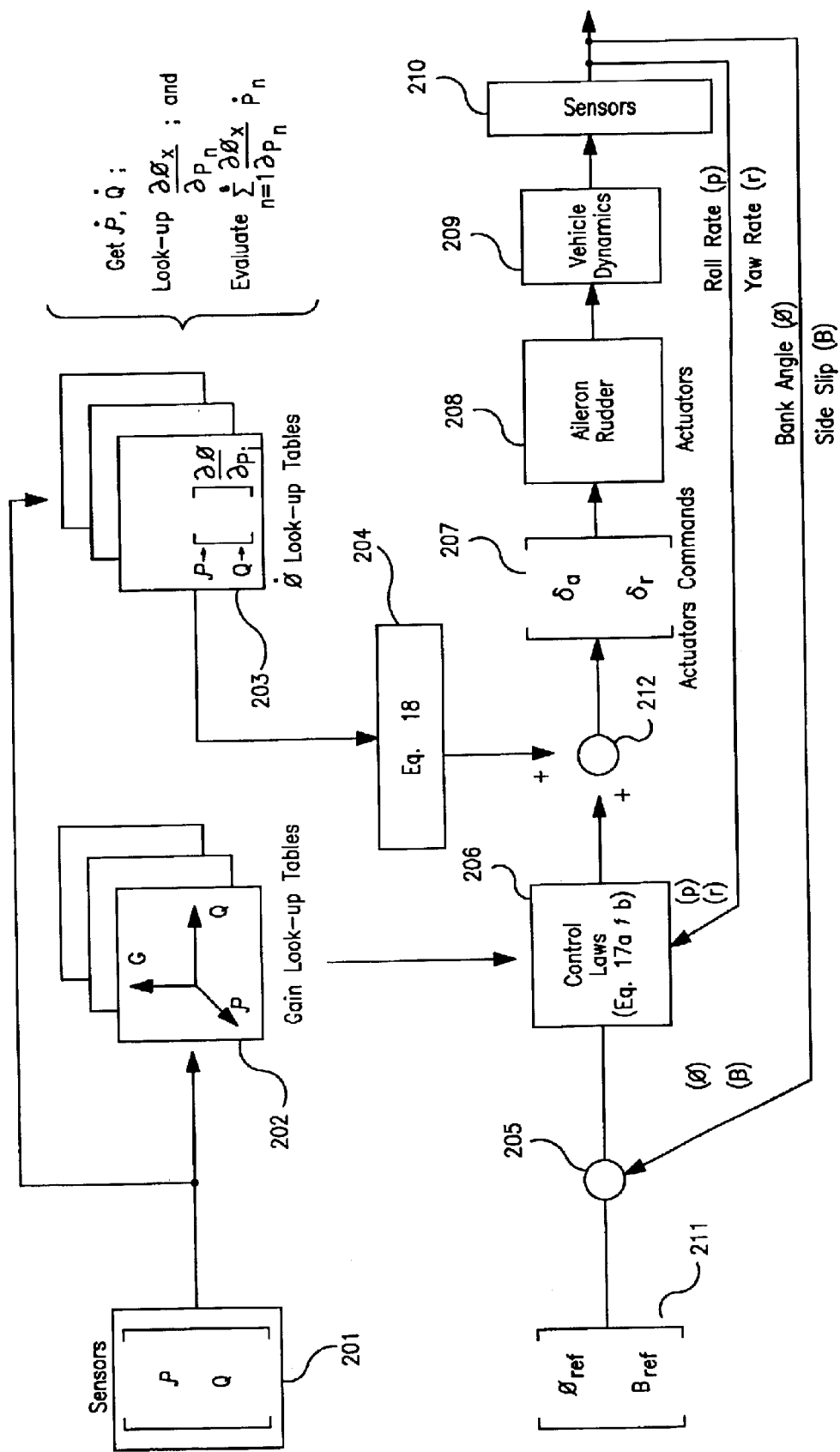
FIG. 2 is a functional block diagram describing an algorithm according to the present invention.

FIG. 2 is a functional block diagram illustrating functional aspects according to the present invention. FIG. 2 illustrates an algorithm according to the present invention including flight control laws for a two-control input (e.g., rudder and aileron), as well as a two-parameter (e.g., air density and dynamic pressure) system. In particular, this algorithm controls the lateral dynamics of an unmanned aircraft (e.g., the Perseus 004 aircraft). As will be appreciated by one of ordinary skill in the art, a system using more than two inputs or more than two parameters is a simple extension of the principles and equations discussed below. Therefore, the invention is not limited to a case or system using only two inputs or two parameters. Instead, the present invention may accommodate any multiple input and multiple parameter system.

As is known, a mathematical model of the aircraft (e.g., a parameter-dependent dynamic system) depicted in FIG. 1 may be written in a physical coordinate system (hereinafter called a coordinate system in x-space). In the case of an aircraft, a Cartesian axis system may have one axis disposed along the fuselage toward the nose, one axis disposed along the wing toward the right wing tip, and one axis disposed straight down from the center of mass, perpendicular to the plane incorporating the first two axes. Measurements via sensors placed along or about these axes provide information regarding, for example, roll rate, bank angle, side slip, yaw rate, angle of attack, pitch rate, pitch attitude, airspeed, etc.

The '119 patent provides a description of the methodology for solving the problem of finding a state space transformation and feedback control law for a single input linear parameter dependent system. The solutions to these problems yield linear parameter dependent ("LPD"; also referred to as linear parameter varying—"LPV") coordinates transformations, which, when applied to system model equations of motion together with Feedback LTI'ing control laws, yield descriptions that are linear time invariant (LTI) in the transformed state space (z-space). As discussed in the '119 patent, a detection filter may be implemented in z-space in which the dynamic system (e.g., an aircraft) may be represented as linear time invariant and, as such, is independent of the dynamic system parameters. Basically, "non-stationary" aircraft flight dynamics equations are transformed into "stationary" linear equations in a general and systematic fashion. In this context, "stationary" implies that the dynamic characteristics are not changing. As a result, a set of constant coefficient differential equations is generated in z-space for modeling the system. The combination of state space transformation and feedback control law (this control law is called a "Feedback LTI'ing control law"), which cancels all the parameter dependent terms, is referred to as "Feedback LTI'zation". By way of example, the solution as described in U.S. Pat. No. '119 would be applicable to control of the longitudinal aircraft dynamics problem, using a single input (e.g., the elevator).

The present invention details the further extension of Feedback LTI'zation to accommodate a multi-input case which is particularly relevant to the lateral axis of a conventional aircraft, using a rudder and ailerons as actuators, for example. As such, the present invention encompasses a control system for controlling dynamic devices and a failure detection system. This formulation is also relevant to high performance aircraft, which may have multiple actuators in both the lateral and longitudinal axes.

In physical terms, the present problem is similar to the one faced in a single input case; namely, a mathematical description of the vehicle dynamics must be found, which does not change as the parameters of the vehicle change. In other words, it is desirable to rewrite a system equations of motion such that the dynamic behavior of the system is always the same and thus very predictable, regardless of what the operating conditions or operating parameters are (e.g., the system dynamics need to be expressed as linear time invariant (LTI) for any parameter value or any rate of change of the parameter values).

This process of describing the equations of motion according to the above requirements can be achieved through a combination of coordinate change and feedback control laws. A coordinate transformation, or diffeomorphism, is determined which transforms the physical coordinates (i.e., x-space) description of the aircraft dynamic mathematical model to a new set of coordinates (i.e., z-space). A Feedback LTI'ing control law is defined to cancel all the z-space parameter dependent terms, so that with this control law, the z-space system is then independent of the parameters. In fact, the behavior of the model in the transformed coordinates is then that of a set of integrators, independent of vehicle operating conditions. It is then possible to prescribe the desired closed loop behavior by means of LTI control design techniques, applied in x-space and transformed to z-space, which is then also valid for any point in the operating envelope (e.g., sea level to 22 km above sea level, and 20 m/s to 46.95 m/s indicated airspeed (IAS)), and for arbitrary values and rates of change of the parameters defining the operating envelope. In this manner only a single, or at worst, a small number of points in the operating envelope may be identified as design points. The diffeomorphism (transformation) has very specific dependence on the parameter values. By evaluating the parameter values and then evaluating the diffeomorphisms at these parameter values, the applicable gains are automatically defined appropriate for the current operating conditions, and thus flight control laws may be obtained for use in the physical coordinates (x-space).

As will be appreciated by those skilled in the art, the process of designing control systems is fundamentally based on meeting requirements for achieving desired closed loop characteristics or behavior. Persons skilled in the art of LTI control design use well known techniques and follow standard procedures to achieve this. In the multivariable control domain for LTI systems, it is indeed possible to prescribe the desired closed loop dynamics of all the characteristic motions of the vehicle, and a known algorithm such as "pole-placement" can be used to determine the gains that will deliver this. Other known techniques such as LQR (Linear Quadratic Regulator theory) can be used to achieve the same goal.

As stated above, the coordinate change is mathematical, and allows a simple and easy mathematical treatment of the full envelope control design problem. The Feedback LTI'ing control law can also be described mathematically, however, it is implemented physically and involves a specific set of control algorithms. These control algorithms, combined with the coordinates change, result in the closed loop controlled physical dynamic behavior that is repeatable and predictable at all regions of the flight envelope.

The problem of finding such a coordinates change (diffeomorphism) and control law, is a central focus of both the feedback linearization and feedback LTI'zation (for linear time varying parameters) problems. Essentially, the problem primarily requires solution of the coordinates transformation matrix. After a solution is found, the rest of the design process follows as a matter of course. Clearly, this coordinate change should not result in any loss of information about the vehicle dynamic behavior. In other words, the specific outputs combinations which ensure that all the dynamic information is retained when observing the system behavior from a different set of coordinates must be found. Finding the specific outputs combinations has a direct relationship with transfer functions, which describe how inputs reach outputs in a dynamic sense. That is, the solution is achieved when the new coordinates result in the feature that all inputs will reach the outputs in a dynamic sense, and are not masked by internal system behavior. As will be appreciated, the coordinates transformation should occur smoothly (e.g., without loss of data or without singularity) in both directions, i.e., from the model (z-space) description in one set of coordinates to the physical coordinates (x-space) description.

Once these output functions, or measurement directions, are known, it becomes a fairly mechanical process to determine the coordinates transformation and feedback control law, respectively. In fact, the present invention establishes that for LPD systems, the entire process of both finding the measurement direction, as well as the diffeomorphism and control laws, all become straightforward procedures, which can also be automated.

Solution of the Feedback LTI'zation Problem for LPD Multi-Input Dynamic Systems

In order to define the diffeomorphism ($\Phi$) and the Feedback LTI'ing control law ($v$), consider the affine multi-input parameter dependent system given by the equations:

$$\dot{x} = f(x, p) + \sum_{i=1}^{m} g_i(x, p) u_i \quad (1)$$

$$y_1 = h_1(x)$$
$$\vdots$$
$$y_m = h_m(x)$$

where $x \in R^n$; $u, y \in R^m$; $p \in R^q$ and where x is a state vector made up of state variables, such as roll rate, yaw rate, side slip, bank angle, etc., $u_i$ is the $i^{th}$ control input (e.g., rudder or aileron, etc.), and the output measurement directions, $h_i(x)$, are to be determined appropriately in order to define the state variable transformation. The functions f(.) and g(.) are functions of both the state vector x as well as the parameter vector p.

First, a multivariable definition of relative degree is needed, namely a vector relative degree, which pertains to the number of zeros in the transfer function from the input vector u to the output vector y. This definition is taken directly from Isidori, discussed above.

Definition

A multivariable system of the form (1) with m inputs and m outputs, has vector relative degree $\{r_1, r_2, \ldots, r_m\}$ at a point $x_o$ if the following hold:

1) For any $1 \leq i,j \leq m$ and for all $k \leq r_i - 1$, $$L_{g_j} L_f^k h_i(x) = 0 \quad (2)$$

where the operator "L" is the Lie derivative.

2) The m by m matrix A(x) is nonsingular at $x_o$, where:

$$A(x) = \begin{bmatrix} L_{g_1} L_f^{r_1-1} h_1(x) & \cdots & L_{g_m} L_f^{r_1-1} h_1(x) \\ \vdots & \ddots & \vdots \\ L_{g_1} L_f^{r_m-1} h_m(x) & \cdots & L_{g_m} L_f^{r_m-1} h_m(x) \end{bmatrix} \quad (3)$$

The vector relative degree implies the multivariable notion of the system having no transfer function zeros, i.e., to ensure that no system characteristic dynamics information is lost by observing the system along the output directions $col\{h_1(x); h_2(x); \ldots; h_m(x)\}$.

State Space Exact Linearization for Multi Input Systems

The state space exact linearization problem for multi-input systems can be solved if an only if there exists a neighborhood U of $x_o$ and m real valued functions $h_1(x)$, $h_2(x), \ldots, h_m(x)$ defined on U, such that the system (1) has vector relative degree $\{r_1, r_2, \ldots, r_m\}$ at $x_o$ and $$\sum_{i=1}^{m} r_i = n,$$

with $g(x_o)=[g_1(x_o)\ g_2(x_o)\ \ldots\ g_m(x_o)]$ of rank m.

It remains to find the m output functions, $h_i(x)$, satisfying these conditions in order to determine the state variable transformation, given by the vectors:

$$\phi_k^i(x)=L_f^{k-1}h_i(x)\ \forall 1\leq k\leq r_i,\ 1\leq i\leq m \tag{4}$$

then the diffeomorphism is constructed as:

$$\Phi = \begin{bmatrix} \phi_1^1(x) \\ \vdots \\ \phi_{r_1}^1(x) \\ \vdots \\ \phi_1^m(x) \\ \vdots \\ \phi_{r_m}^m(x) \end{bmatrix} \tag{5}$$

Solving for the m Output Functions for LPD Systems. Two Inputs Example

It is directly demonstrated in this section how to find the output functions for the LPD lateral dynamics of the aircraft model, with rudder and aileron inputs, and all state variables (sideslip, roll rate, yaw rate and bank angle) measured. Of course, other inputs and state variables could be solved for as well. In this case, m=2 and the model can be written:

$$\dot{x}=Ax+Bu \tag{6}$$

with $x \in R^4$ and $u \in R^2$. As will be appreciated by those of ordinary skill in the art, variable A can represent an air vehicle dynamics matrix and variable B can represent a control distribution matrix. Variable u represents a vector of control, having variables corresponding to the rudder and aileron, and x represents a system state vector (e.g., x=[side slip, bank angle, roll rate, and yaw rate]). The vector relative degree of the system is $\{r_1, r_2\}=\{2,2\}$ and the summation $$\sum_{i=1}^{m} r_i = n$$

is satisfied for $r_i$=2, m=2, and n=4. Evaluating the terms according to equation (2), yields for outputs $y_1=C_1x$ and $Y_2=C_2x$:

$C_1B_1=0$ $C_1B_2=0$ $C_2B_2=0$ $C_2B_2=0$.

$C_1AB_1=1$ $C_1AB_2=0$ $C_2AB_1=0$ $C_2AB_2=1 \tag{7}$ where $C_i$ is the $i^{th}$ measurement direction. Note that the lower four equations of equation (7) satisfy the requirement that equation (3) be nonsingular. These can be rearranged in matrix form:

$$\begin{bmatrix} \leftarrow C_1 \rightarrow \\ \leftarrow C_2 \rightarrow \end{bmatrix} [B_1\ B_2\ AB_1\ AB_2] = \begin{bmatrix} 0 & 0 & 1 & 0 \\ 0 & 0 & 0 & 1 \end{bmatrix} \tag{8}$$

which then allows solution for $C_1$ and $C_2$, following which, the transformation matrix, or diffeomorphism, can be written according to equations (4) and (5), as $$\Phi = \begin{bmatrix} \leftarrow C_1 \rightarrow \\ \leftarrow C_2 \rightarrow \\ \leftarrow C_1A \rightarrow \\ \leftarrow C_2A \rightarrow \end{bmatrix} \tag{9}$$

Feedback LTI'ing Control Law for a Two Input Lateral Aircraft Dynamics Model

The transformed z-space model is then determined, where z is the z-space state vector, $\Phi$ is the diffeomorphism, and x is the x-space state vector, from:

$$z = \Phi x$$
$$\therefore$$
$$\dot{z} = \dot{\Phi}x + \sum_{i=1}^{q} \frac{\partial \Phi x}{\partial p_i}\dot{p}_i$$
$$= \Phi Ax + \Phi Bu + \sum_{i=1}^{q} \frac{\partial \Phi x}{\partial p_i}\dot{p}_i$$
$$= \Phi A\Phi^{-1}z + \Phi Bu + \sum_{i=1}^{q} \frac{\partial \Phi x}{\partial p_i}\dot{p}_i$$
$$= A_z z + B_z u + \sum_{i=1}^{q} \frac{\partial \Phi x}{\partial p_i}\dot{p}_i$$

which has the matrix form $$\dot{z} = \begin{bmatrix} 0 & 0 & 1 & 0 \\ 0 & 0 & 0 & 1 \\ \leftarrow \alpha_1(z) \rightarrow \\ \leftarrow \alpha_2(z) \rightarrow \end{bmatrix} z + \begin{bmatrix} 00 \\ 00 \\ 10 \\ 01 \end{bmatrix} u + \sum_{i=1}^{q} \frac{\partial \Phi x}{\partial p_i}\dot{p}_i \tag{10}$$

$$= \begin{bmatrix} 0 & 0 & 1 & 0 \\ 0 & 0 & 0 & 1 \\ 0 & 0 & 0 & 0 \\ 0 & 0 & 0 & 0 \end{bmatrix} z + \begin{bmatrix} 00 \\ 00 \\ 10 \\ 01 \end{bmatrix} v$$

where the new dynamics and control distribution matrices are denoted $A_z$ and $B_z$, respectively. A new input is defined as follows to cancel the parameter dependent terms $\alpha_1(z)$ and $\alpha_2(z)$ and the summation term which includes parameter rate of change terms (i.e., representing the dependence of the coordinates transformation on the rate at which the parameters change), thus yielding the feedback LTI'ing control law, which together with the diffeomorphism of equation (9) has transformed the LPD system (6) into an LTI system given by the last line of (10).

$$v = (B_z'B_z)^{-1}B_z'\left\{\begin{bmatrix} 0 & 0 & 0 & 0 \\ 0 & 0 & 0 & 0 \\ \leftarrow \alpha_1(z) \rightarrow \\ \leftarrow \alpha_2(z) \rightarrow \end{bmatrix} z + \sum_{i=1}^{q} \frac{\partial \Phi x}{\partial p_i}\dot{p}_i + B_z u\right\} \tag{11}$$

This system (10) is now ready for application of LTI feedback control design, while the LTI'ing control law of

(11) ensures that the system parameter dependence is accommodated in the physical control law implementation.

Solving for Gain Lookup Tables

The feedback LTI'ing control law (Eq. 11) for the two control input case is written as:

$$v = (B'_z B_z)^{-1} B'_z \left\{ \begin{bmatrix} 0 & 0 & 0 & 0 \\ 0 & 0 & 0 & 0 \\ \leftarrow & \alpha_1 & (z) & \rightarrow \\ \leftarrow & \alpha_2 & (z) & \rightarrow \end{bmatrix} z + \sum_{i=1}^{q} \frac{\partial \Phi_x}{\partial p_i} \dot{p}_i + B_z u \right\} \quad (12)$$

For the full state feedback z-space control law of the form $v = -K_z z$ and ignoring the parameter rate of change terms for evaluating the lookup table gains (locally linear gains), the relationship between z-space locally linear gains and x-space locally linear gains is as follows (where equivalently $u = -K_x x$):

$$K_x = (B'_z B_z)^{-1} B'_z \left\{ \begin{bmatrix} 0 & 0 & 0 & 0 \\ 0 & 0 & 0 & 0 \\ \leftarrow & \alpha_1 & (z) & \rightarrow \\ \leftarrow & \alpha_2 & (z) & \rightarrow \end{bmatrix} + B_z K_z \right\} \Phi \quad (13)$$

$$= (B'_z B_z)^{-1} B'_z \{A_z + B_z K_z\} \Phi$$

From this expression, it will be obvious to one of ordinary skill in the art that the lookup gains may be stored as either x-space lookup tables ($K_x$), or as z-space lookup tables ($K_z$). In the case of storing the z-space gains, it is also necessary to store the z-space matrices $A_z$ and $B_z$, as well as the diffeomorphism. This latter case amounts to real time evaluation of z-space gains and then converting these to true physical space gains as opposed to performing this transformation off-line and simply storing the x-space gains in lookup tables.

Note that the full control law includes both the locally linear gain term as well as the parameter rate of change term of equation (12).

Extending to Allow Design of Failure Detection Filter

U.S. Patent '119 shows the application to design a failure detection filter (FDF) for the single input case. The previous sections showed the general multi-input solution of the feedback ("FBK") LTI'zation problem resulting in a set of LTI equations of motion in z-space, with the same number of inputs as the original co-ordinates model. This section shows the application of the ideas described in the '119 patent to the multi input case, specifically, an example is given for the two input case. As will be appreciated by those skilled in the art, the more-than-two input case is a simple extension of the same form of equations.

With knowledge of the diffeomorphism coefficients, it is now possible to define the FDF in transformed coordinates, which will be the single fixed-point design valid for the entire operating envelope of the system (e.g., aircraft). The failure detection filter is initially designed at a nominal operating point in the flight envelope, using the model described in physical coordinates, and taking advantage of the insight gained by working in these coordinates. This design is then transformed into the z-space coordinates to determine the transformed space failure detection filter which is then unchanged for all operating points in the flight envelope.

The z-space model is now, from equation (10), given by $$\dot{z} = \begin{bmatrix} 0 & 0 & 1 & 0 \\ 0 & 0 & 0 & 1 \\ 0 & 0 & 0 & 0 \\ 0 & 0 & 0 & 0 \end{bmatrix} z + \begin{bmatrix} 00 \\ 00 \\ 10 \\ 01 \end{bmatrix} v \quad (14)$$

and the FDF appropriately designed for the relevant failure modes yields the gain matrix $H_z$ with the implemented system of the following form:

$$\dot{\hat{z}} = [A_z - H_z]\hat{z} + H_z \Phi x_{measured} + B_z v \quad (15)$$

or in physical vehicle coordinates, $$\dot{\hat{x}} = \Phi^{-1}[A_z - H_z]\Phi\hat{x} + \Phi^{-1} H_z \Phi x_{measured} + B_x v \quad (16)$$

where the subscript z refers to the transformed state space, and the subscript x refers to physical coordinates state space. Also, $x_{measured}$ refers to the measured state variables. For example, the measured values of roll rate (p), yaw rate (r), bank angle ($\phi$) and sideslip ($\beta$). Since the full state vector is measured, each of the state variables is available in physical coordinates.

Returning to FIG. 2, the multi-input feedback LTI'zation control law design example is given for the two input (aileron and rudder actuators) and two parameters (air density and dynamic pressure) case of controlling the lateral dynamics of an aircraft, as shown in FIG. 1. Specifically, FIG. 2 show an example using reference bank angle ($\phi$ref) and sideslip ($\beta$ref) signals to control the aircraft 1. As will be appreciated by those of ordinary skill in the art, if a pilot wants the aircraft to fly right wing down ten degrees, he simply commands the bank angle of 10 degrees and the control law will cause the aircraft to fly with the right wing down 10 degrees. Likewise, if the pilot wants the nose of the aircraft to point 5 degrees to the left of the incoming airflow, this is achieved by commanding 5 degrees of sideslip, and the control laws will cause the ailerons and rudder to move in such a fashion as to deliver flight with the nose at 5 degrees to the incoming airflow.

As mentioned above, flight control laws are typically a plurality of equations used to control flight in a predictable way. Flight control laws are well known to those of ordinary skill in flight and vehicle controls and will not be described in greater detail herein. However, reference may be had to the text "AIRCRAFT DYNAMICS AND AUTOMATIC CONTROL," by McRuer, et al., Princeton University Press, 1973, incorporated herein by reference.

Known flight control laws for operating the aircraft rudder and aileron may be simplified as:

Rudder Control Law (Equation 17a):

$$\delta r = -G_{RdrBeta}(\text{Beta} - \text{BetaRef}) - G_{RdrRollRate}(\text{RollRate}) - G_{RdrYawRate}(\text{YawRate}) - G_{RdrRoll}(\text{Roll} - \text{RollREf}) - G_{RdrBetaIntegrator}\int(\text{Beta} - \text{BetaRef})dt - G_{RdrRollIntegrator}\int(\text{Roll} - \text{RollRef})dt$$

where $\delta r$ represents commanded rudder deflection angle, "G" terms represent rudder control law gains, Beta represents measured sideslip, RollRate represents measured roll rate, Roll represents measured bank angle, RollRef represents a reference bank angle and YawRate represents the measured yaw rate.

Aileron Control Law (Equation 17b):

$$\delta a = -G_{AilBeta}(\text{Beta} - \text{BetaRef}) - G_{AilRollRate}(\text{RollRate}) - G_{AilYawRate}(\text{YawRate}) - G_{AilRoll}(\text{Roll} - \text{RollREf}) - G_{AilBetaIntegrator}\int(\text{Beta} - \text{BetaRef})dt - G_{AilRollIntegrator}\int(\text{Roll} - \text{RollRef})dt$$

where $\delta a$ represents commanded aileron deflection angle, "G" terms represent aileron control law gains, Beta represents measured side slip (e.g., measured with a sensor), RollRate represents measured roll rate, Roll represents measured bank angle, RollRef represents a reference bank angle and YawRate represents the measured yaw rate.

The integrator terms shape the closed loop vehicle dynamics by compensating for the steady state error which typically results without these extra terms.

Including the parameter rate of change term, yields the final control law:

$$\begin{bmatrix} \delta a \\ \delta r \end{bmatrix} = \begin{bmatrix} \delta a \\ \delta r \end{bmatrix}_{\dot{p}_i=0} - (B'_z B_z)^{-1} B'_z \sum_{i=1}^{q} \frac{\partial \Phi_x}{\partial p_i} \dot{p}_i \quad (18)$$

As discussed above, the "G" (gain) terms can be i) evaluated off-line, and stored in RAM look-up tables, and/or ii) evaluated in real-time, as discussed above with respect to Eq. 13.

As seen in FIG. 2, reference bank angle ($\phi$ref) and reference side-slip ($\beta$ref) signals 211 are compared (205) with sensor signals reflecting the aircraft's current bank angle ($\phi$) and side slip ($\beta$), respectively. These values are input (or utilized by) into equations 17, along with sensor signals representing the aircraft's actual roll-rate (p) and yaw-rate (r). The current dynamic air pressure (Q) and air density ($\rho$) are evaluated from sensor signals 201 and the corresponding gain values (e.g., "$G_i$"), implemented in one embodiment as RAM look-up tables as functions of aircraft dynamic pressure and air density 202, are applied to the control laws 206. The appropriate gain value is determined by interpolation between neighboring points in the lookup tables. The required number of gain look-up tables corresponds to the number of state variables plus any required integrals, multiplied by the number of control inputs (e.g., actuators). For example, the lateral axis of an aircraft has four (4) state variables (i.e., sideslip, bank angle, roll rate, and yaw rate) and two integrals (sideslip error and bank angle error) for each actuator (i.e., rudder and aileron), for a total of twelve (12) gain tables. Hence, in the lateral axis case, there are twelve (12) corresponding look-up tables. If, for example, the longitudinal axis were also considered, using an integral airspeed hold control mode and actuating via the elevator, five more look-up tables would be required. In the longitudinal axis case, there are four state variables (i.e., angle of attack, pitch rate, pitch attitude, and true airspeed) and one (1) integrator (i.e., the integral of airspeed minus airspeed reference). In another embodiment, the gain values can be calculated in real time, as discussed above with respect to Eq. 13.

The control gains ($G_i$) can be numerically evaluated in the control law design process in z-space, using Linear Quadratic Regulators (LQR) theory, a well defined and widely known LTI control design technique. Pole placement or any other known LTI technique could also be used. As will be appreciated by those of ordinary skill in the art, LQR theory provides a means of designing optimal control solutions for LTI systems. A quadratic cost function, which penalizes state variable excursions and actuator deflections in a weighted fashion, is solved for. The steady state solution yields a set of gains and a specific full state feedback control law which defines how aircraft motion is fed back to deflecting the control surfaces in order to maintain desired control at a constant operating condition, i.e., constant parameter values.

At any specific operating condition, defined by $\rho$ and Q, the control gains are then transformed into x-space via equation (13), ignoring the dp/dt term for purposes of determining the gains, and stored in the RAM look-up tables. The dp/dt term is included as per equation (18), with relevant terms evaluated numerically, as discussed below. Alternatively, the values for the control gains can be determined in real time, every computational cycle (e.g., every 60 milliseconds or faster, depending on the required processing speed for the specific aircraft application), by two (2) dimensional interpolation for the current air density and dynamic pressure that the aircraft is experiencing at any point in time, as discussed above with respect to Eq. 13. A second alternative is to fully determine the control commmands in z-space, and then transform these to physical control commands using equation (12) and solving for u.

Parameter rate of change terms are evaluated numerically 203 for use in equation 18 (204). Parameter rate of change terms compensate for or capture the varying rates of change of the operating conditions, as experienced by the aircraft. For example, as an aircraft dives, the air density changes while the aircraft changes altitude. In order to accommodate the effect of the changing density on the dynamic behavior of the aircraft, the control system preferably accounts for the varying air density.

An aircraft flying at high altitude and high true airspeed, typically exhibits much poorer damping of it's natural dynamics, than at low altitude and low airspeed. This effect varies as the speed and altitude varies, and the rate of change of the altitude and airspeed also influence the dynamic behavior. In order to deliver similar closed loop behavior even whilst, e.g., decelerating, the rate of change of dynamic pressure must be accounted for in the dp/dt terms of the control law.

Typically, parameters can be measured by means of a sensor, for example, dynamic pressure can be directly measured, but the rate of change of the parameter is not typically directly measured. In this case, the rate of change value is determined numerically through one of many known methods of taking discrete derivatives, as will be appreciated by those skilled in the art. One example of such a numerical derivative evaluation is by evaluating the difference between a current measurement and the previous measurement of a parameter, and dividing by the time interval between the measurements. This quotient will give a numerically evaluated estimate of the rate of change of the parameter. These rate of change parameter values are evaluated in real time. The other component of the parameter rate of change term, i.e., $d\phi/dp_i$ is also numerically evaluated and can, however, be stored off-line in look-up tables or evaluated in real time.

Blocks 204 and 206 are combined (in summing junction 212) to yield complete flight control commands for the rudder 103 and ailerons 101 (in block 207). Signals are sent to the rudder and ailerons in 208, effecting control of the air vehicle dynamics (as shown in block 209). As mentioned above, sensors (210) feed back current roll rate, yaw rate, bank angle and slide-slip signals, and the above process is repeated, until the current measured bank angle and sideslip signals match the respective reference signals.

Figure 3:
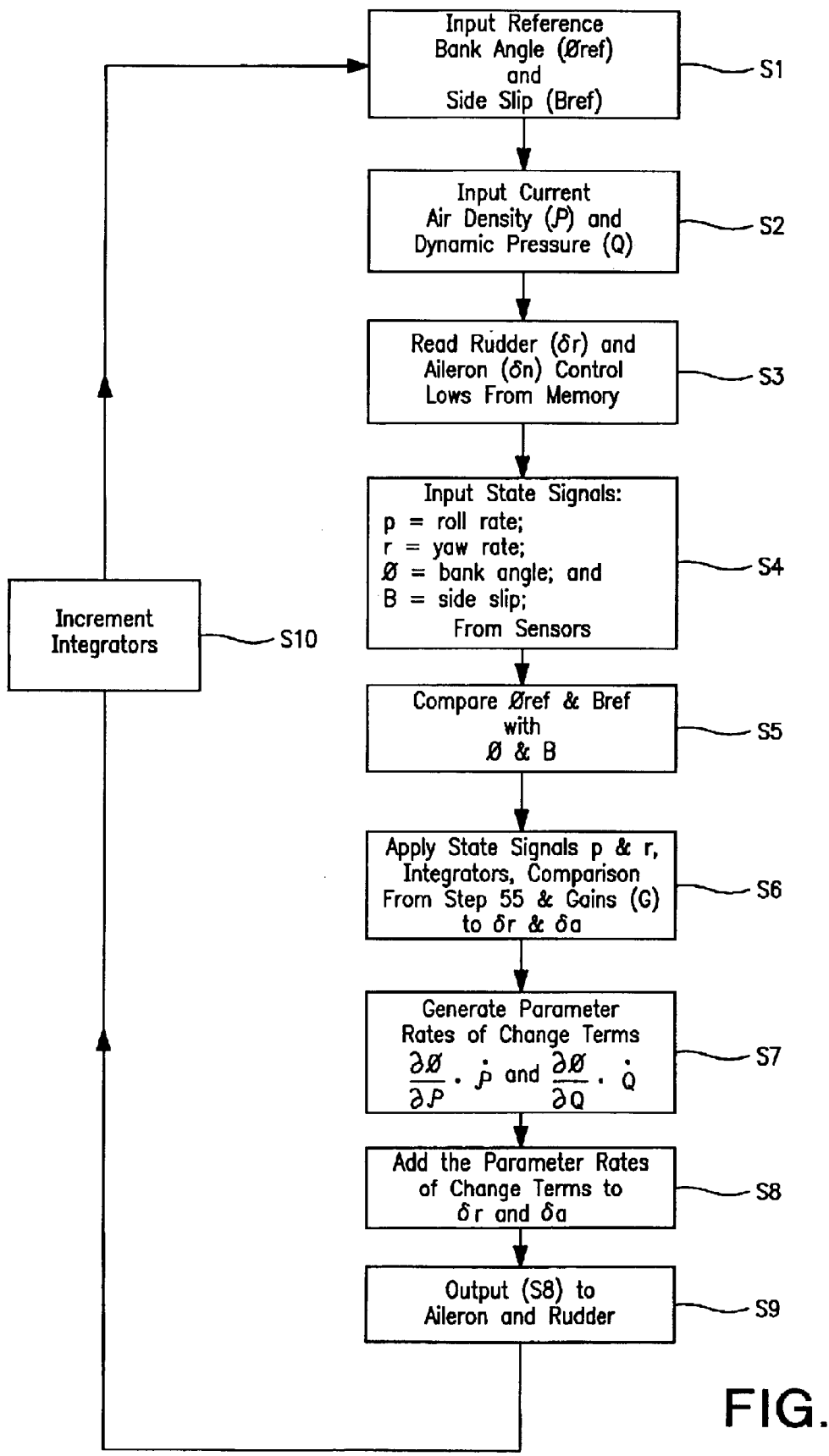
FIG. 3 is a flowchart showing a software flow carried out in the flight control computer of FIG. 1.

FIG. 3 is a flowchart depicting the software control carried out by the flight control computer 104. By way of illustration, a "decrabbing" maneuver is described in relation to FIG. 3. A decrabbing maneuver is executed when an aircraft experiences a crosswind while landing. To perform the decrabbing maneuver, an aircraft on final approach to landing faces into the crosswind, and then at a moment prior to landing, adjusts so that the nose of the aircraft is pointed down (i.e., is parallel to and along) the runway. For this decrabbing maneuver example, a 10 degree crosswind is imagined. To compensate for the crosswind, the control system determines that in order to maintain a steady course (zero turn rate) whilst in a 10 degree sideslip condition, a 3 degree bank angle adjustment is also needed. Hence, in this example, the reference sideslip (βref) and bank angle (φref) are 10 degrees and 3 degrees, respectively.

Referring to FIG. 3, in step S1, the reference sideslip (βref) and bank angle (φref) are input as reference signals. In step S2, the current air density (ρ) and dynamic pressure (Q) are input from sensors. In step S3, the rudder (δr) and aileron (δa) control laws are read from memory. In step S4, the roll rate (p), yaw rate (r), bank angle (φ) and sideslip (β) signals are input from sensors.

In step S5, βref and φref are compared with β and φ signals from sensors. In step S6, signals p and r, the comparison from step S5, sideslip and bank angle integrators, and control gains (Gi) are applied to the rudder (δr) and aileron (δa) control laws. These control gains ($G_i$) are preferably off-line resolved to capture z-space transformations. In step S7, parameter rates of change terms are generated. Note that if the vehicle parameter rates of change are very small, these terms would be very small in magnitude and as such may be eliminated from the control law.

In step S8, the parameter rates of change generated in step S7 are applied to the rudder (δr) and aileron (δa) control laws. In step S9, a control signal is output to the aileron 101 and rudder 103 actuators, effecting control of the aircraft.

The control law integrators are incremented in step S10. In the de-crabbing maneuver example, the logic flow continues adjusting the rudder and aileron until β and φ approximate 10 and 3 degrees, respectively. In this manner, the control system compensates for the 10-degree crosswind, by turning the aircraft's nose parallel to the runway just prior to landing. A high-level control function may be implemented with the above-described control system to effect landing. For example, the high-level control could be a pilot or automatic control algorithm such as an autoland.

Figure 4:
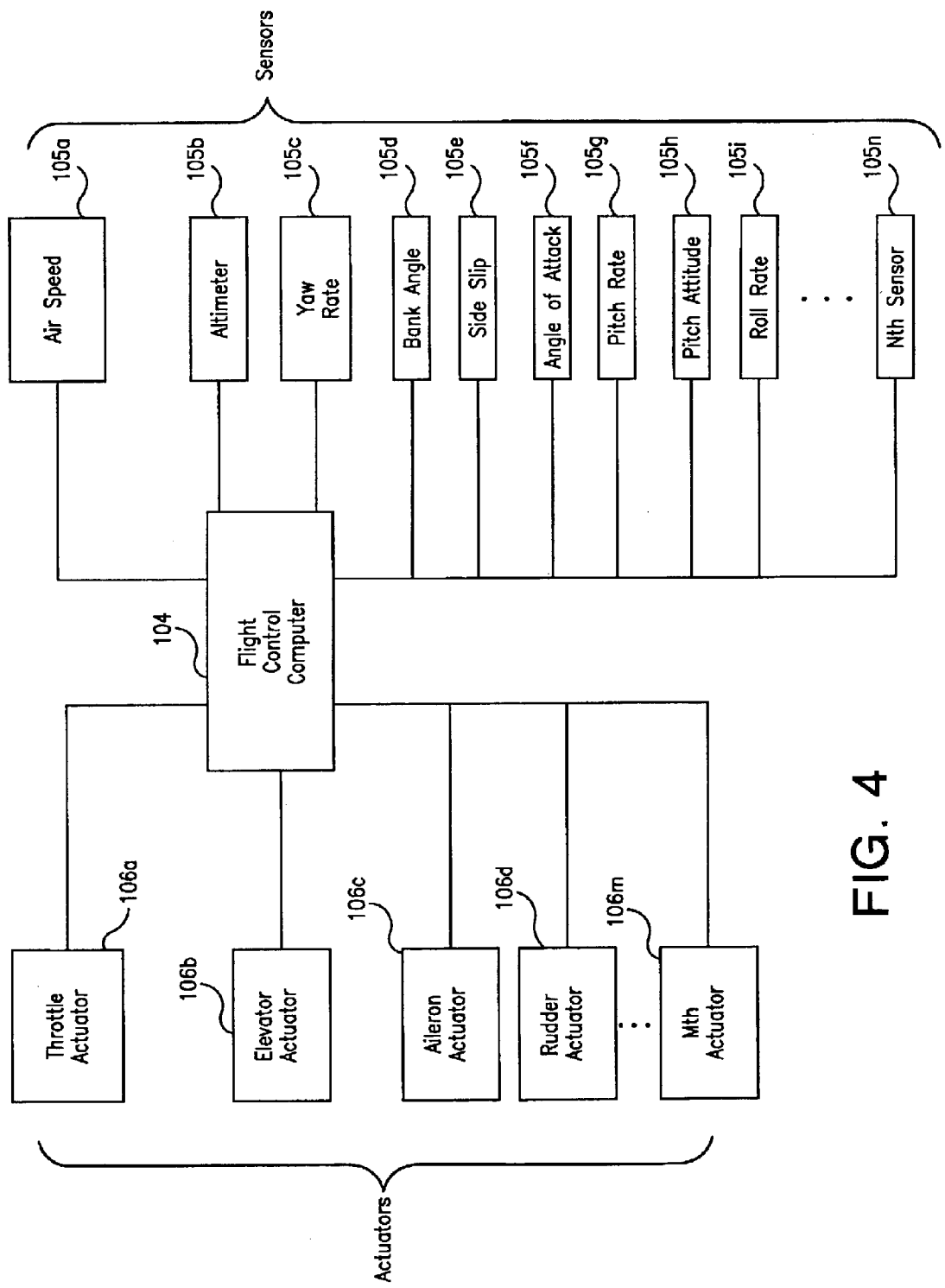
FIG. 4 is a block diagram of the flight control computer, sensors, and actuators, according to the FIG. 1 embodiments.
Figure 5A:
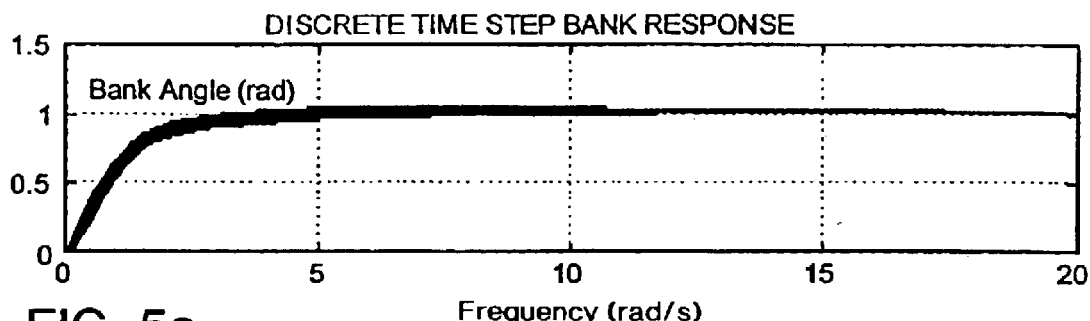
FIGS. 5a and 5b are overlaid discrete time step response plots according to the present invention.
Figure 5B:
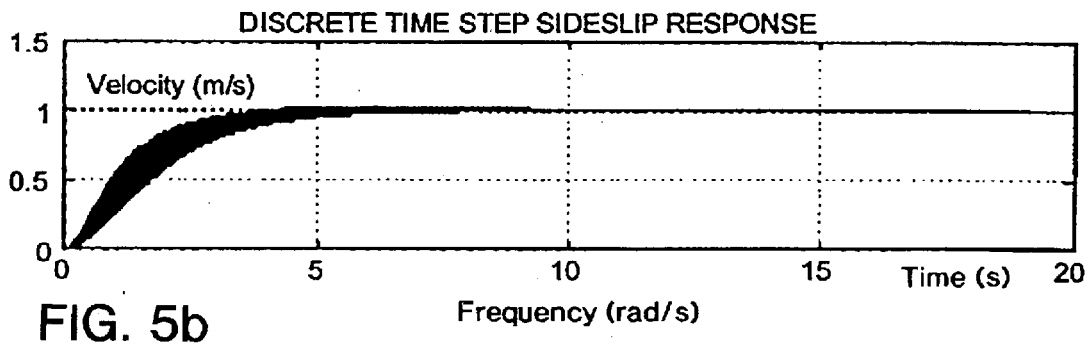
Figure 5C:
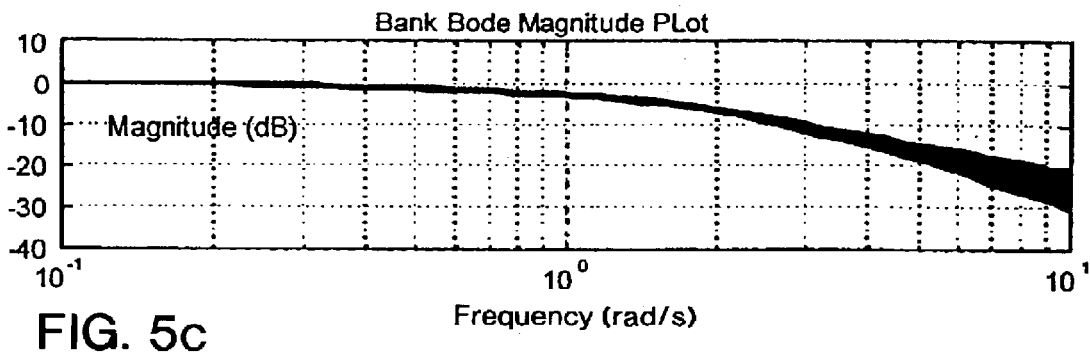
FIGS. 5c and 5d are overlaid Bode magnitude plots according to the present invention.
Figure 5D:
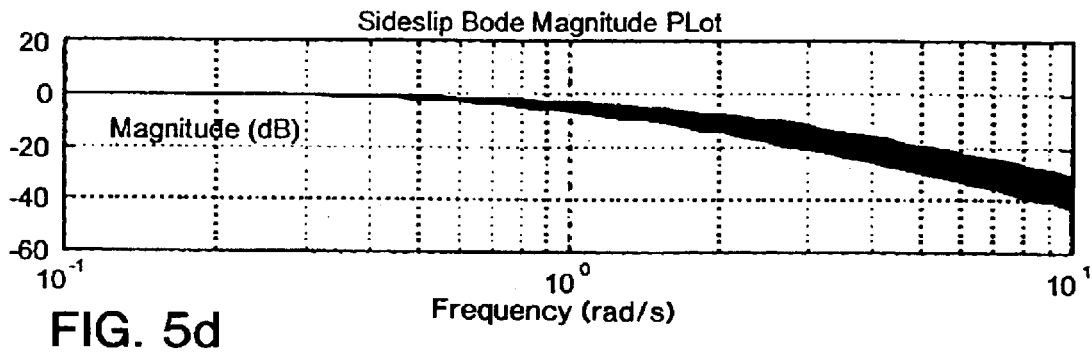

FIG. 4 is a block diagram showing the relationship between the various sensors, actuators and the flight control computer 104. As can be seen, flight control computer 104 receives input from various sensors, including airspeed 105a, altimeter 105b, yaw rate 105c, bank angle 105d, side slip 105e, angle of attack 105f, pitch rate 105g, pitch attitude 105h, roll rate 105i and Nth sensor 105n. The various sensor signals are inserted into the appropriated flight control laws and the outputs are actuator command signals, such as to the throttle 106a, elevator 106b, aileron 106c, rudder 106d, and Mth actuator 106m.

Applying Feedback LTI'zation to Designing Control Laws

An example of the control law design techniques according to the present invention will now be described with respect to FIGS. 5a–30. Essentially, the design process involves transforming the coordinates for the vehicle equations of motion into z-space. This step has been detailed in equations 1–18, above. Known LTI control design techniques are used as a framework for the control gains design process. Parameter values at a few desired design points in the operating envelope are selected. LTI design techniques are applied to the physical LTI models at the (few) selected parameter values, to yield desired closed loop dynamics. These designs are transformed into the transformed coordinates (in z-space) to yield z-space gains that give desired closed loop behavior for the controlled system. If more than one design point was selected, these z-space gains are linearly interpolated over the operating envelope, otherwise the gains are constant in z-space for the full envelope. Finally, a discrete number of parameter values, corresponding to lookup table axes, is selected, and the reverse transformation applied to define the physical coordinates lookup gain tables for use as discussed above with respect to FIGS. 2 and 3, for example.

Figure 7:
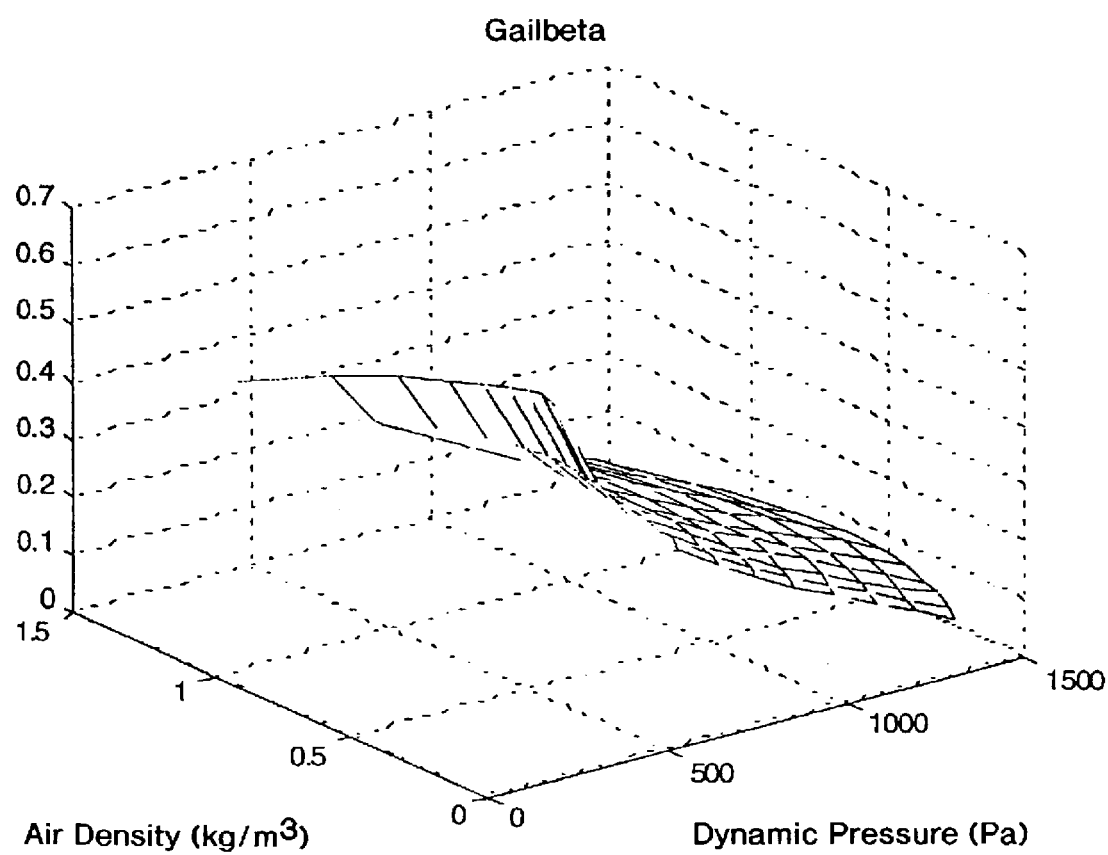
FIGS. 7–18 are 3-D plots of auto pilot gains vs. air density and dynamic pressure according to the present invention.
Figure 8:
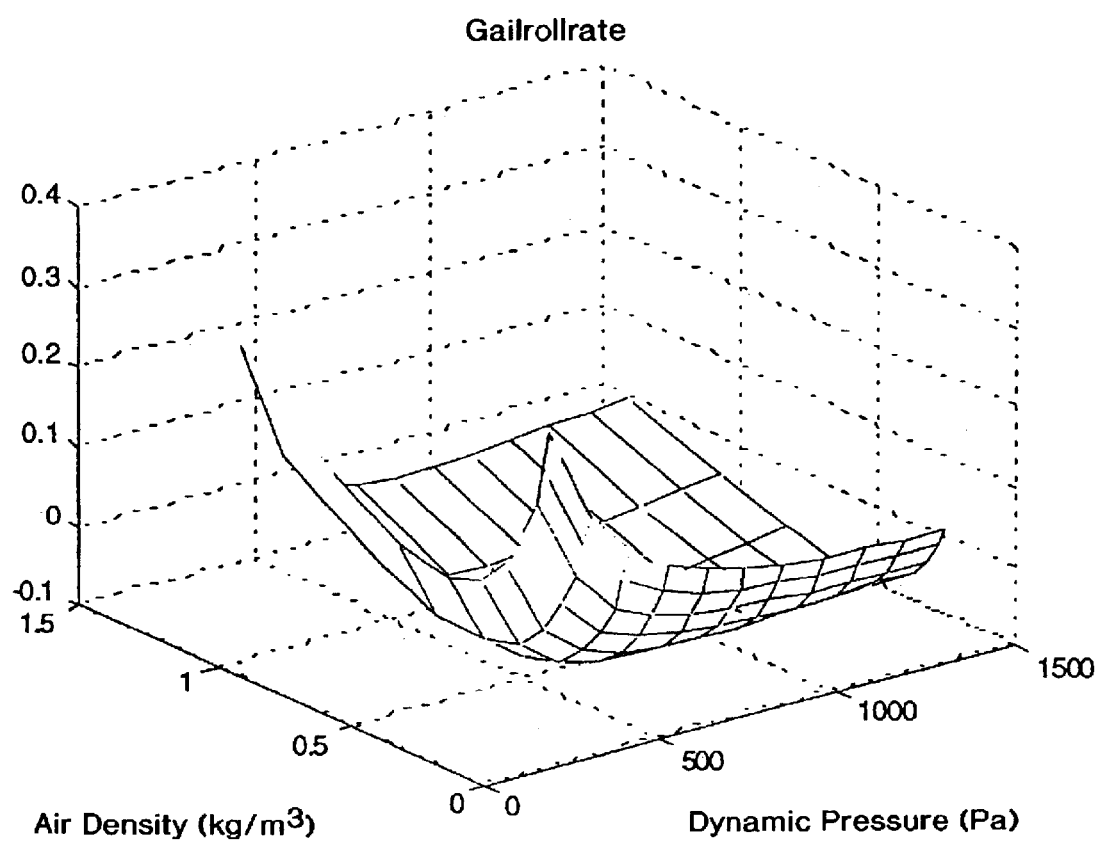
Figure 9:
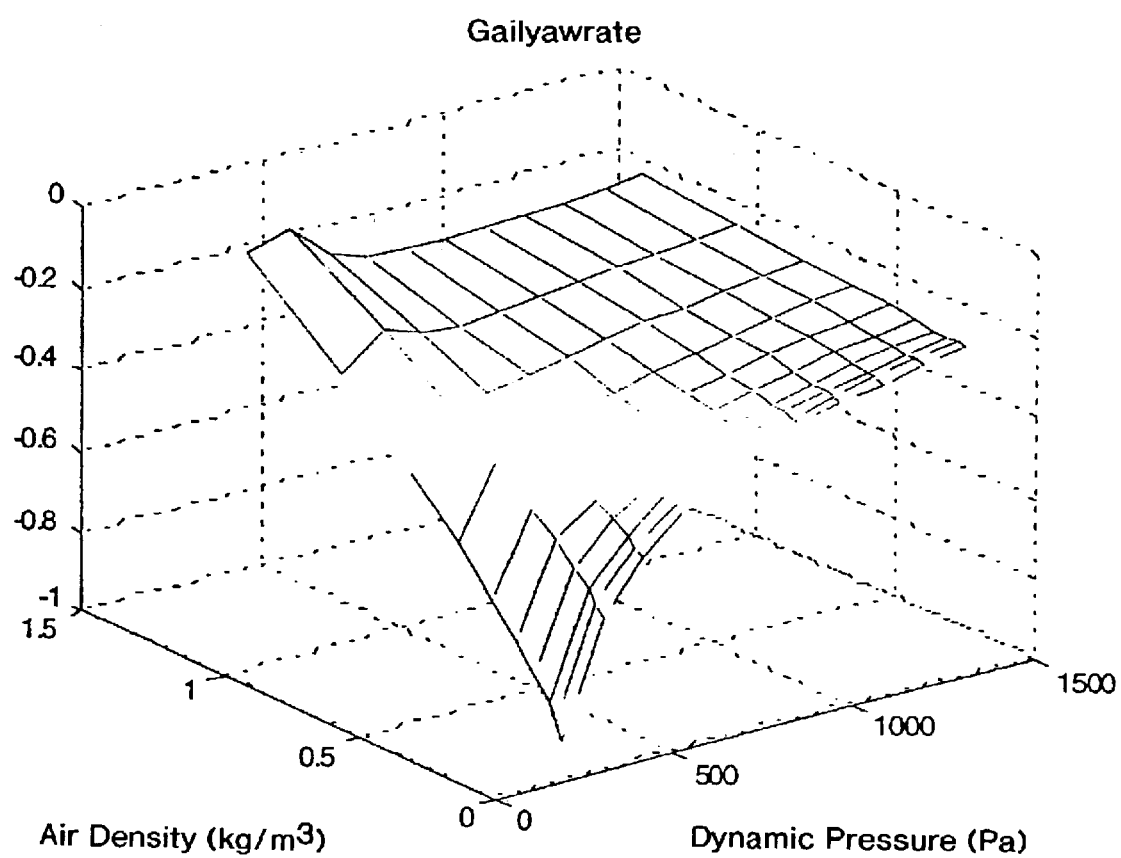
Figure 10:
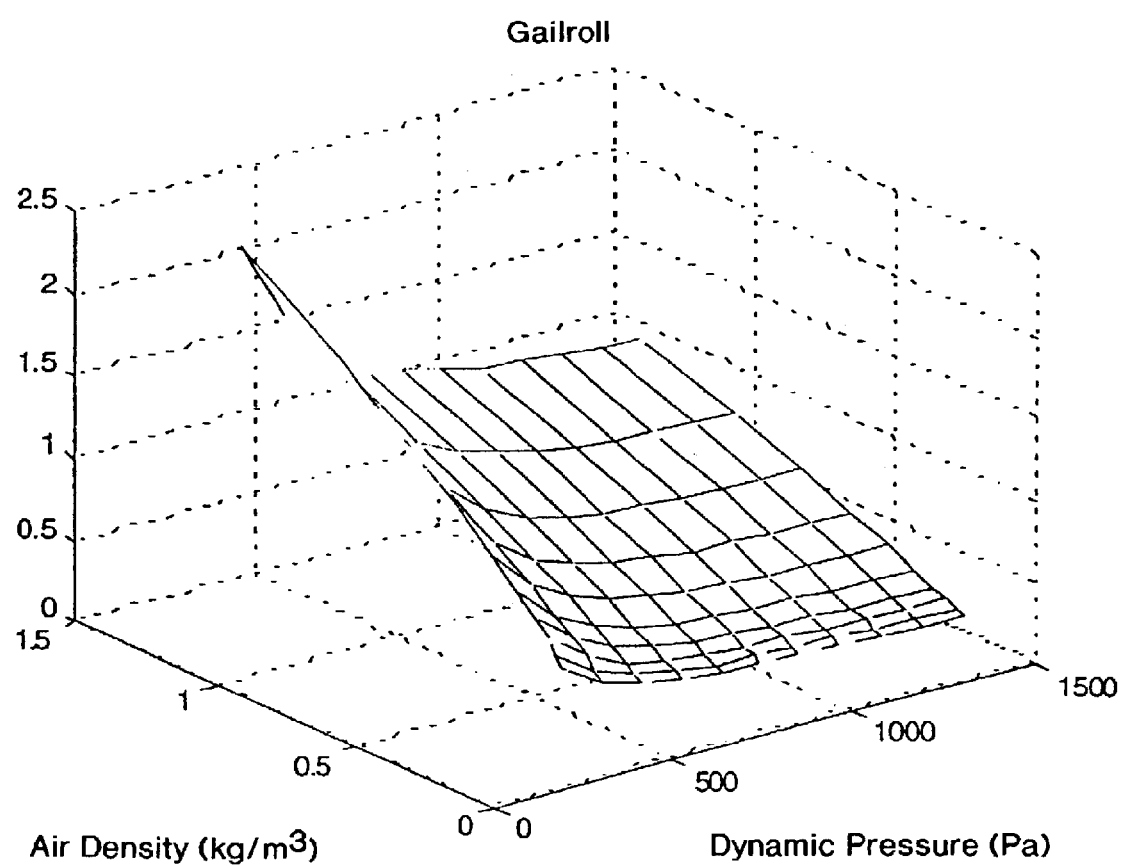
Figure 11:
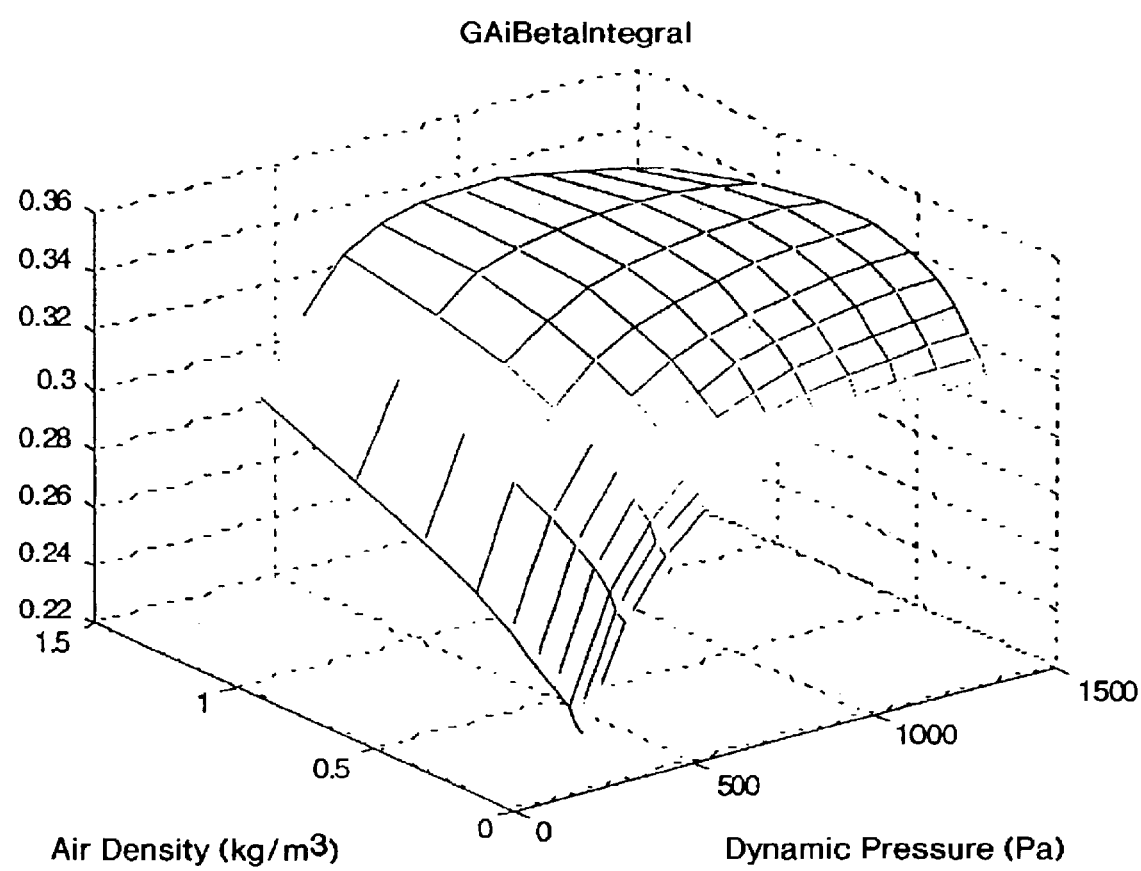
Figure 12:
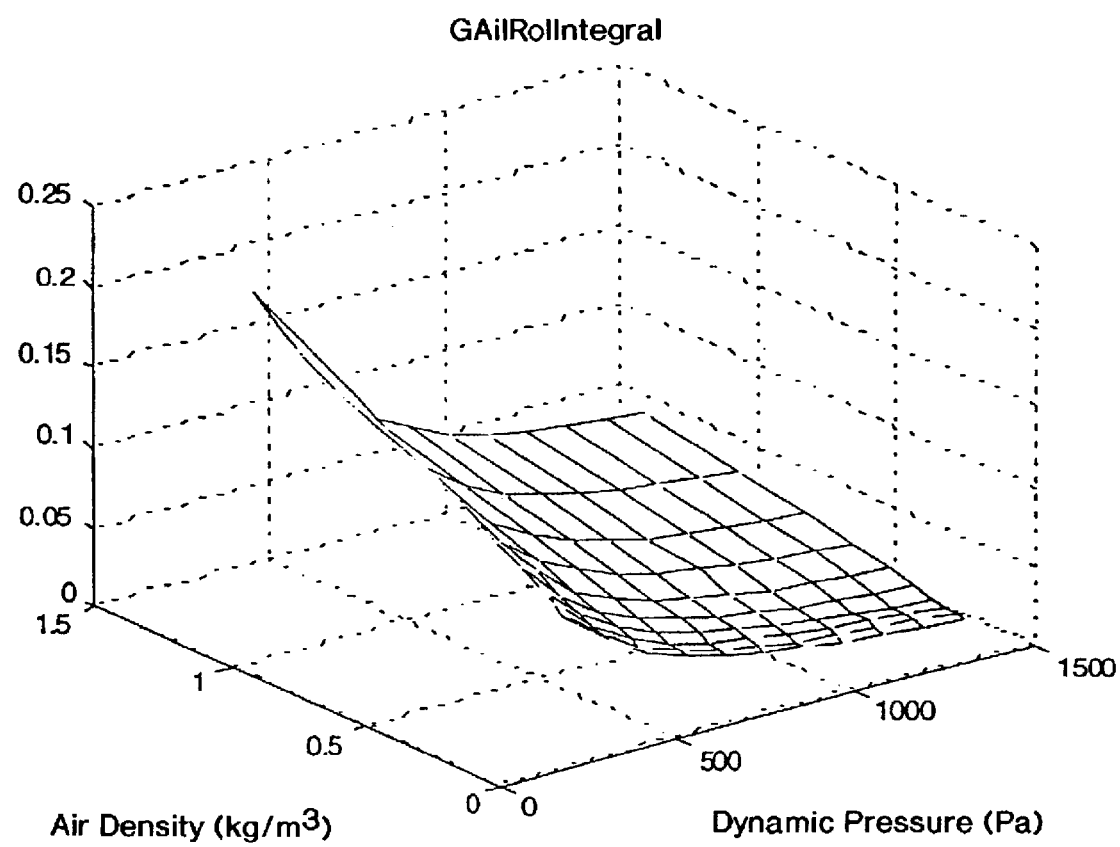
Figure 13:
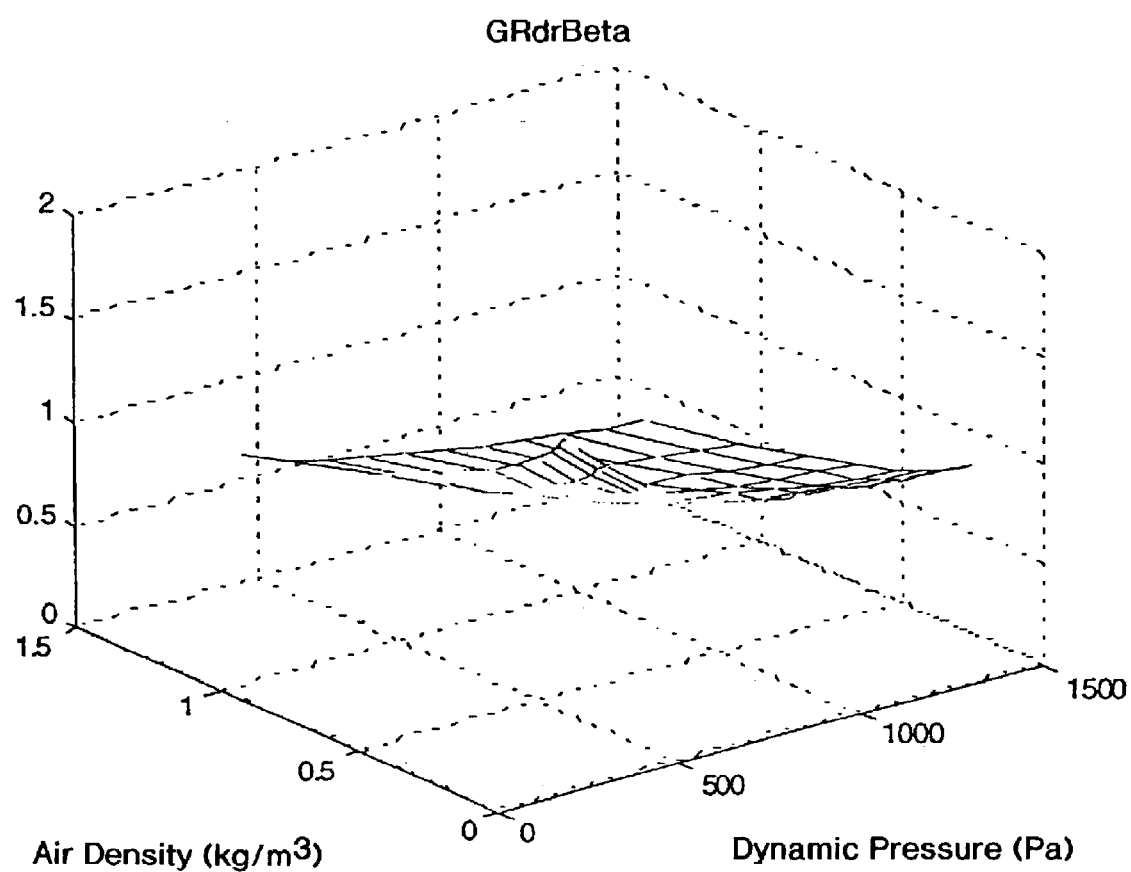
Figure 14:
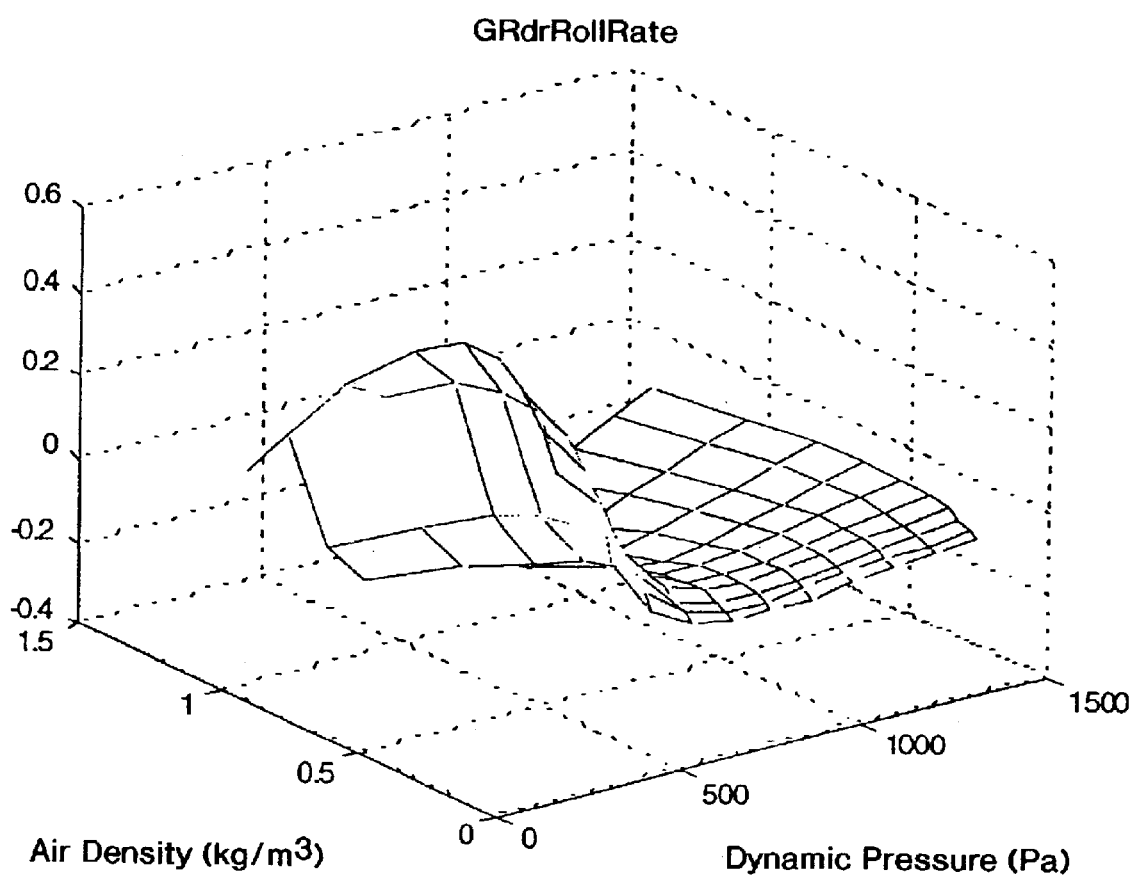
Figure 15:
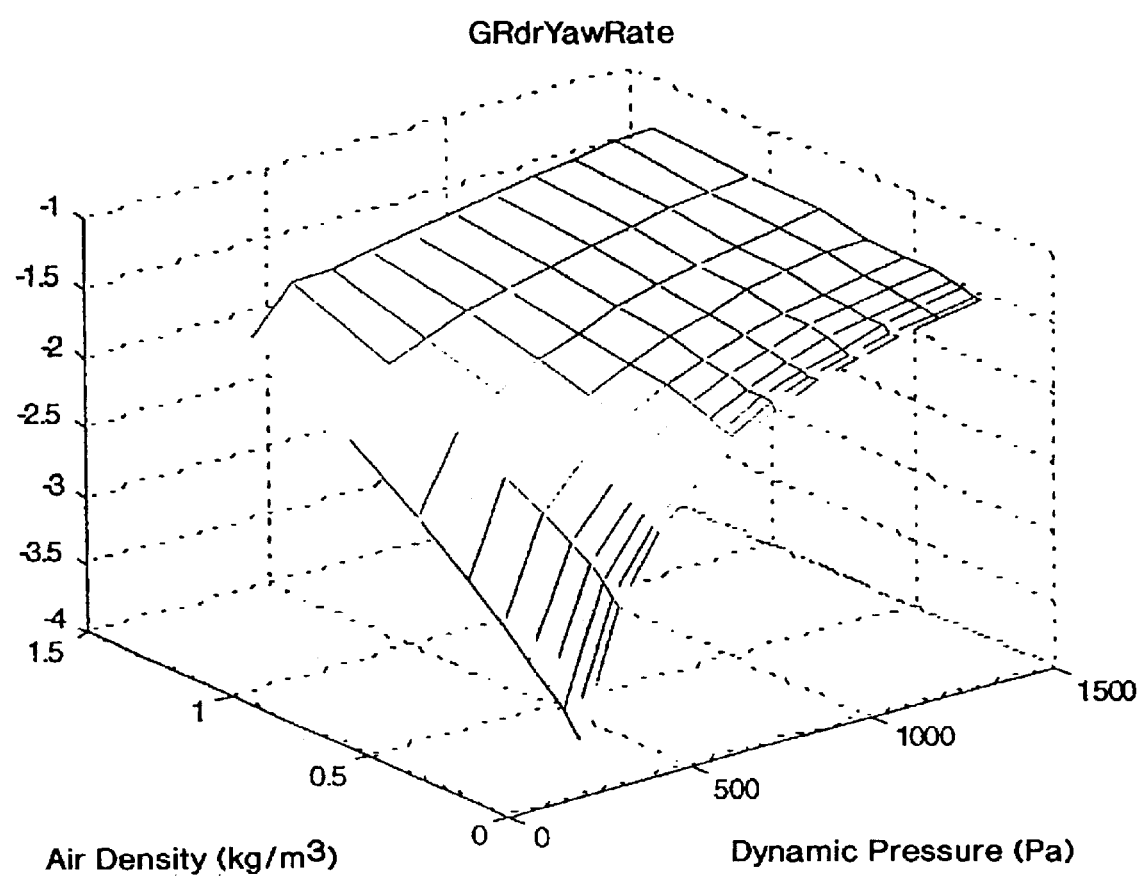
Figure 16:
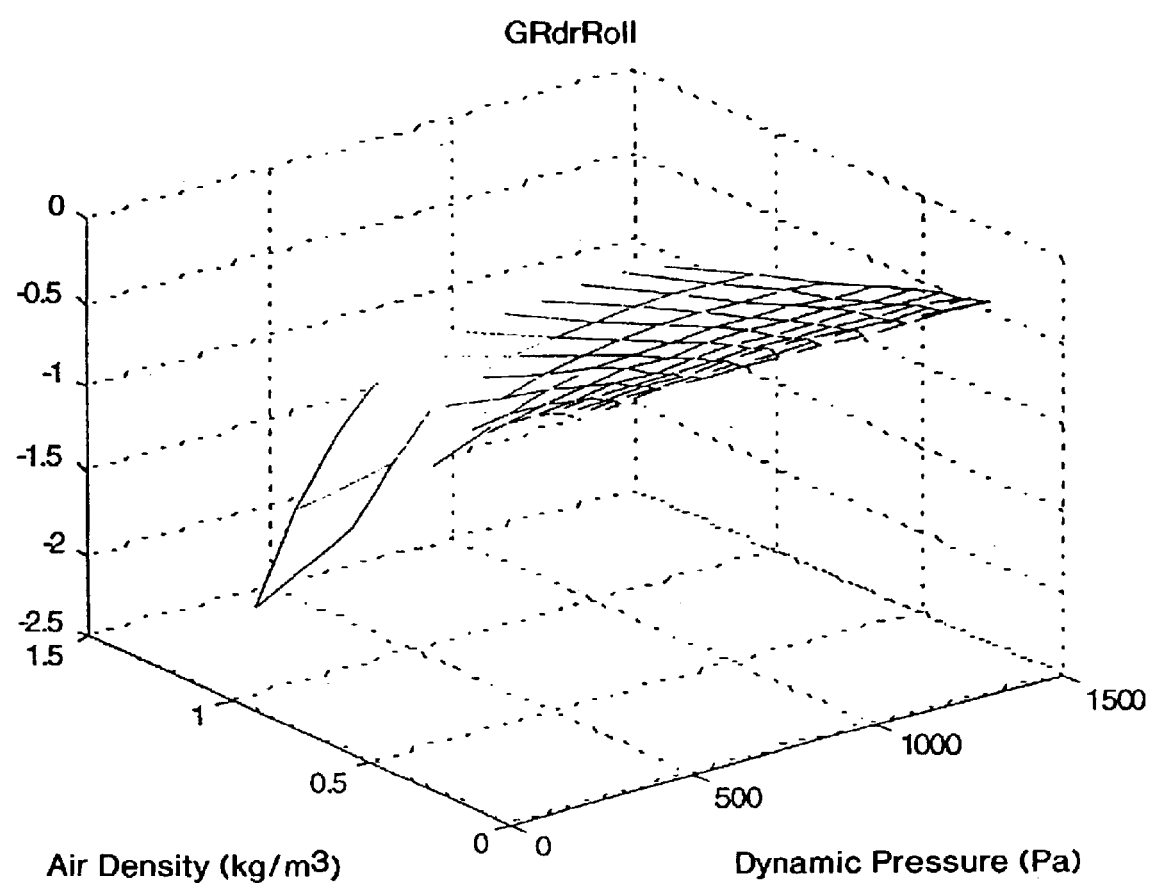
Figure 17:
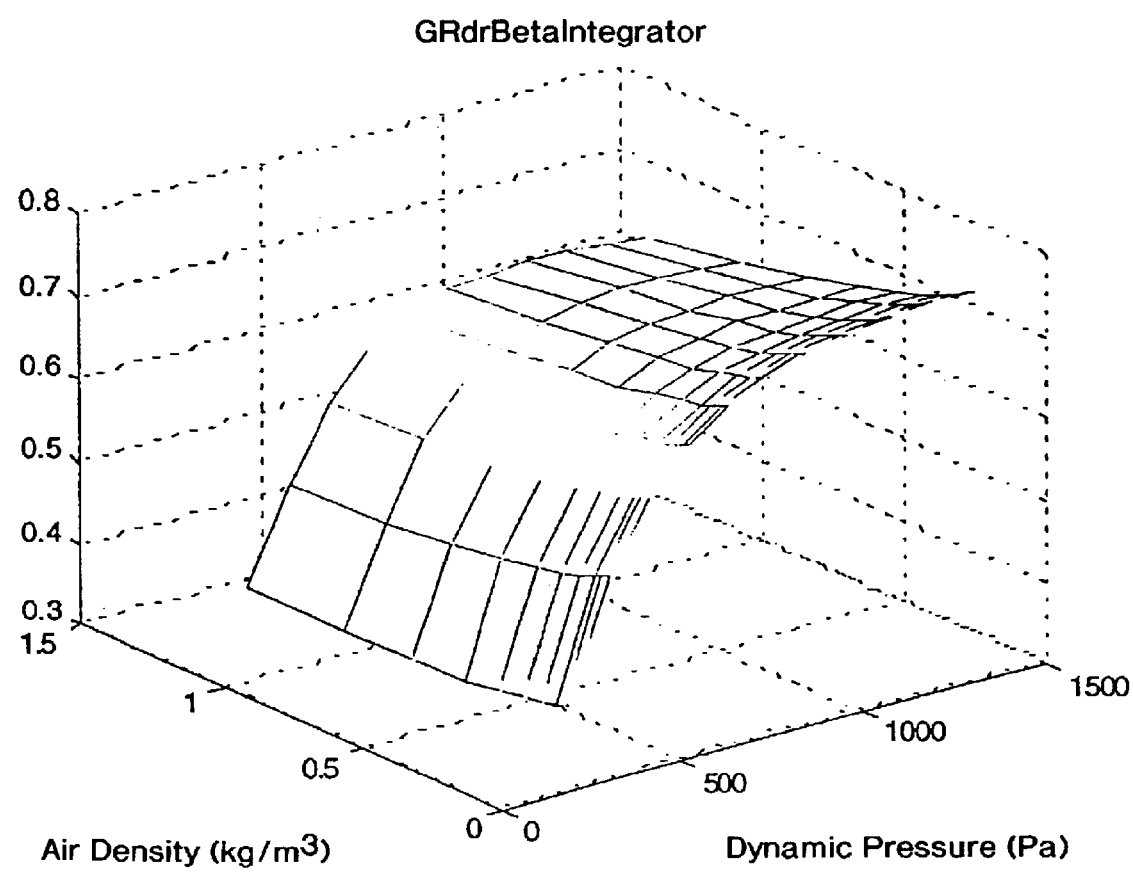
Figure 18:
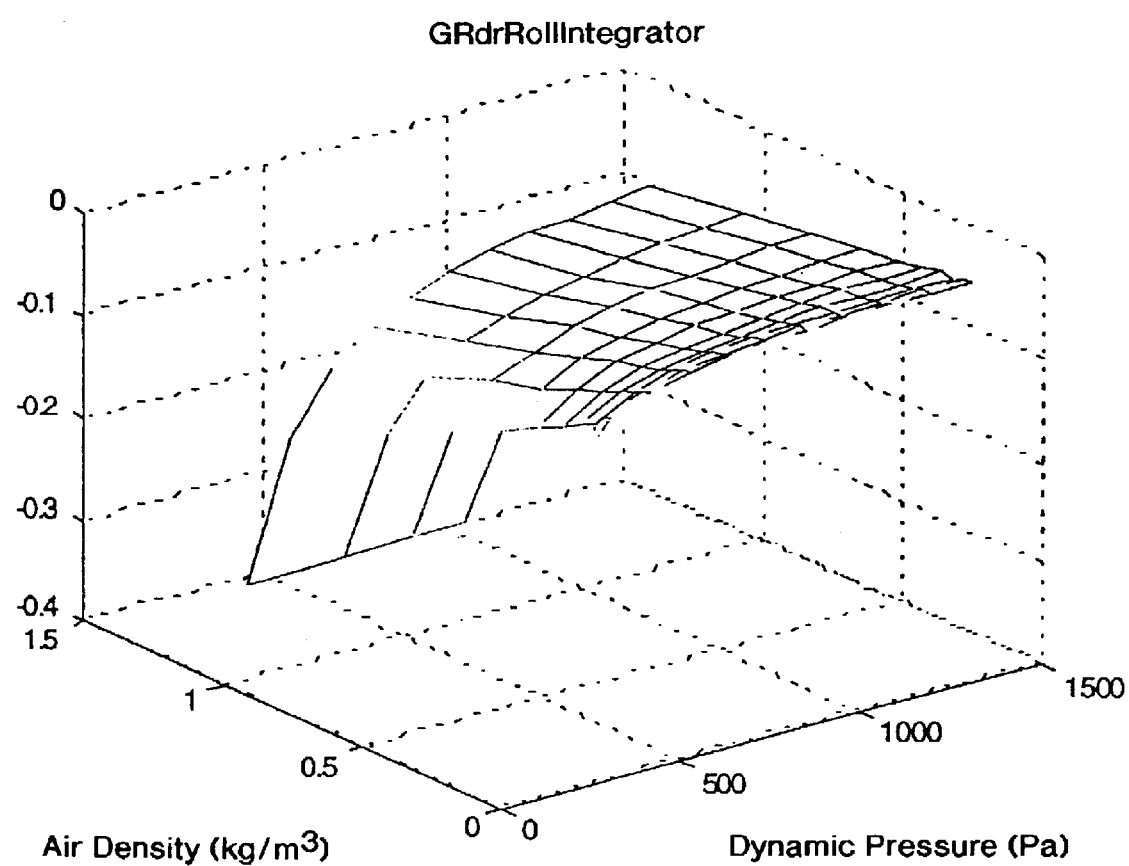

By way of example, FIGS. 7–18 show lateral auto pilot gains in 3-D plot form for the lateral axis of the Perseus 004 aircraft aircraft over a flight envelope of sea level to 22 km altitude and 20 m/s to 46.95 m/s IAS). Each figure illustrates an auto pilot gain with respect to air density (kg/m³) and dynamic pressure (Pa). In particular, FIG. 7 illustrates side slip to aileron feedback gain; FIG. 8 illustrates roll rate to aileron feedback gain; FIG. 9 illustrates yaw rate to aileron feedback gain; FIG. 10 illustrates roll attitude to aileron feedback gain; FIG. 11 illustrates side slip integrator to aileron feedback gain; FIG. 12 illustrates roll integrator to aileron feedback gain; FIG. 13 illustrates side slip to rudder feedback gain; FIG. 14 illustrates roll rate to rudder feedback gain; FIG. 15 illustrates yaw rate to rudder feedback gain; FIG. 16 illustrates roll attitude to rudder feedback gain; FIG. 17 illustrates side slip integrator to rudder feedback gain; and FIG. 18 illustrates roll attitude integrator to rudder feedback gain. Each of the represented gains is illustrated in physical coordinates.

FIGS. 19–30 are corresponding matrix numerical gain lookup tables for the lateral axis of the Perseus 004 aircraft over a flight envelope of sea level to 22 km altitude and 20 m/s to 46.95 m/s IAS. FIGS. 19–30 provide the numerical data for FIGS. 7–18, respectively. The format for each of FIGS. 19–30 is as follows: the first row is a dynamic pressure lookup parameter in Pa, the second row is a density lookup parameter in kg/m^3, and the remainder of rows are gain values.

Together, FIGS. 7–30 illustrate part of the design process for determining gains. In this example, optimal LQR designs are generated at four discrete design points corresponding to the four corners of the control design flight envelope (i.e., sea level to 22 km altitude and 20 m/s to 46.95 m/s IAS). The four design points are thus low speed at high density; high speed at low density; low speed at low density; and high speed at high density. Feedback LTI'zation is used to map these four designs into smooth gain scheduling look-up tables at 110 points in a density—dynamic pressure space. Each of the four (4) designs is done at a selected steady state flight condition (density, speed combination), in physical co-ordinates, since the designer readily understands these. The resulting gains (physical) at each design point are then transformed into z-space, and by reversing this transformation (i.e., from z to physical co-ordinates) at any parameter values, the physical coordinates lookup table values are populated. Typically, a selected matrix of parameter values is defined, and the lookup tables are populated for these parameter values. The process of populating the gain tables simply executes equation 11, and does not require the designer to intervene at each table lookup parameter value. This is a major reason for the savings in design effort and time, namely that only a few design points are required, and then the full envelope is covered by appropriate transformation using equation 11. Note that this results in physical gains that can be used in real time in the control law. It is also feasible to perform real time reverse co-ordinates transformations from the z-space gains, at every time step, to determine the x-space gains in real time. In this case, the lookup tables store z-space gains and not physical x-space gains.

Root loci and step response data are used to evaluate performance and robustness during the design process. In particular, FIGS. 5a–5d show the full envelope design results for a lateral auto pilot control system design for the Perseus 004 aircraft. In particular, overlaid discrete bode plots (i.e., FIGS. 5c and 5d) and step responses (i.e., FIGS. 5a and 5b) are shown for all combinations of air density and dynamic pressure in the gain tables covering the design envelope of sea level to 22 km above sea level and 20 m/s to 46.95 m/s IAS. This illustrates how the design can be used to achieve similar and well behaved closed loop performance across the full envelope of operation, while requiring only a very small number of design points—namely four design points in this example.

FIG. 6 illustrates the S-plane root loci for closed loop and open loop lateral dynamics over the entire flight envelope for the Perseus 004 aircraft, at the discrete density and dynamic pressure values in the lookup table. Open loop poles are circles, and closed loop poles are crosses. Closed loop poles all lie inside the 45 degree sector from the origin about the negative real axis, which is the design criterion for good damping characteristics. By design, the closed loop modal frequency magnitudes are not increased significantly over the open loop values. This reduces the danger of actuator saturation in normal envelope operation, as well as danger of delays due to too high closed loop mode frequencies for the sample period of 60 ms. The design goal of better than 70 percent damping of all modes is achieved, without significantly altering the modal frequencies.

This design example is particularly tailored between only four design points, namely one at each corner of the density/ dynamic pressure space, which defines the flight control design envelope. At each of the four design points, the well known LQR control design algorithm is used for determining the controller gains, as discussed above. The four point designs are then transformed into a new set of coordinates, i.e., the so called z-space via feedback LTI'zation routines, which are then further invoked to determine the physical gains over the entire flight envelope, based on linear blending in z-space of the four point designs. The four point designs yield four sets of gains in z-space, and these are simply linearly interpolated between the four design points to provide linearly blended gains in z-space. This technique achieves an approximately linear variation of closed loop bandwidth over the design envelope.

By transforming the single point design gains into z-space, where the definition of z-space forces the system to be LTI, the control gains at any other operating condition can be easily determined by simply reversing the co-ordinates transformation process. This allows the single design point to be transformed into z-space and reverse transformed to an infinite number of operating conditions different from the design point. Including the parameter rate of change terms then also allows transition between design points without disturbing the closed loop behavior, in the sense that the closed loop characteristics remain constant. It is this coordinates transformation step that allows a very small number of design points to cover the full operating envelope of the vehicle. Those of ordinary skill in the art will appreciate that the "few" design point case has very similar attributes to the single design point case.

Thus, what has been described is a control system (and method) to control a dynamic device or system with multiple control inputs and multiple parameter dependencies. An efficient method of control law design has also been described for such multi-input, parameter dependent dynamic systems.

The individual components shown in outline or designated by blocks in the drawings are all well known in the arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

I claim the following:

1. A method of determining the operational status of a multi-input, multi-parameter dependent control system for controlling a dynamic device, said method comprising the steps of:
   receiving a plurality of current status signals representing current statuses of the device and a plurality of control signals for effecting control of the device;
   transforming the current status signals and the control signals to a multi-input linear time invariant system;
   estimating an expected behavior of the device using the transformed current status signals and the transformed control signals; and
   determining the operational status of the control system by comparing the expected behavior of the device to the actual behavior of the device.

2. The method of claim 1, further comprising the steps of:
incrementally adjusting at least one parameter based on the determined operational status of the control system; and
updating the determination of the operational status by repeating the receiving, transforming, estimating, and determining steps.

3. The method of claim 2, wherein characteristics of the dynamic device are definable by at least one control law, and wherein the step of incrementally adjusting comprises the steps of:
generating at least one parameter rate of change term; and
applying the at least one parameter rate of change term to the at least one control law.

4. The method of claim 3, wherein the generating step is performed using linear interpolation.

5. The method of claim 3, wherein the generating step is performed using extrapolation techniques.

6. The method of claim 3, wherein the generating step is performed using curve fitting.

7. The method of claim 2, wherein the dynamic device comprises a flight vehicle, and wherein the plurality of status signals includes at least one of the group consisting of an airspeed signal, an altimeter signal, a yaw rate signal, a bank angle signal, a side slip signal, an angle of attack signal, a pitch rate signal, a pitch attitude signal, and a roll rate signal.

8. The method of claim 7, wherein the at least one parameter corresponds to at least one of the group consisting of a throttle, an elevator, an aileron, and a rudder, and the step of incrementally adjusting comprises using an actuator to physically adjust at least one of the group consisting of a throttle, an elevator, an aileron, and a rudder.

9. The method of claim 7, wherein the flight vehicle is unmanned.

10. The method of claim 2, wherein the steps of incrementally adjusting and repeating are performed at predetermined time intervals.

11. A multi-parameter dependent control system for controlling a dynamic device having multiple inputs, said system comprising:
receiving means for receiving a plurality of current state signals representing current states of the device and a plurality of control signals for effecting control of the device;
transforming means for transforming the current state signals and the control signals to a linear time invariant system;
estimating means for estimating an expected behavior of the device using the transformed current state signals and the transformed control signals and for generating estimate signals corresponding to the expected behavior, and
determining means for determining the operational status of the control system by comparing the expected behavior of the device to the actual behavior of the device.

12. The system of claim 11, further comprising:
adjusting means for incrementally adjusting at least one parameter based on the determined operational status of the control system, wherein
the determining means is further configured to update the determination of the operational status by repeating a use of the receiving means, transforming means, estimating means, and determining means when an incremental adjustment has been made.

13. The system of claim 12, wherein characteristics of the dynamic device are definable by at least one control law, and wherein the adjusting means is further configured to:
generate at least one parameter rate of change term; and
apply the at least one parameter rate of change term to the at least one control law.

14. The system of claim 13, wherein the adjusting means is further configured to generate the at least one parameter rate of change term by using linear interpolation.

15. The system of claim 13, wherein the adjusting means is further configured to generate the at least one parameter rate of change term by using extrapolation techniques.

16. The system of claim 13, wherein the adjusting means is further configured to generate the at least one parameter rate of change term by using curve fitting.

17. The system of claim 12, wherein the dynamic device comprises a flight vehicle, and wherein the plurality of current state signals includes at least one of the group consisting of an airspeed signal, an altimeter signal, a yaw rate signal, a bank angle signal, a side slip signal, an angle of attack signal, a pitch rate signal, a pitch attitude signal, and a roll rate signal.

18. The system of claim 17, wherein the at least one parameter corresponds to at least one of the group consisting of a throttle, an elevator, an aileron, and a rudder, and wherein the adjusting means is further configured to use an actuator to physically adjust at least one of the group consisting of a throttle, an elevator, an aileron, and a rudder.

19. The system of claim 17, wherein the flight vehicle is unmanned.

20. The system of claim 12, wherein the adjusting means is further configured to make an incremental adjustment at predetermined time intervals.

21. Apparatus for detecting a failure in a flight control device having multiple inputs and operating in an environment having multiple parameters, comprising:
processing structure for (i) receiving time-varying status signals from the flight control device, (ii) providing reference signals corresponding to the flight control device, (iii) transforming both the status signals and the reference signals to a linear time invariant coordinate system, (iv) calculating flight control device estimate signals based on the transformed status signals and the transformed reference signals, (v) transforming the calculated estimate signal in a physical coordinate system, and (vi) detecting an error in the flight control device when a difference between the transformed estimate signals and the status signals exceed a predetermined threshold.

22. The apparatus of claim 21, wherein the time-varying status signals include at least one of the group consisting of an airspeed signal, an altimeter signal, a yaw rate signal, a bank angle signal, a side slip signal, an angle of attack signal, a pitch rate signal, a pitch attitude signal, and a roll rate signal.

23. The apparatus of claim 21, wherein the processing structure is further configured to calculate flight control estimate signals using at least one control law.

24. The apparatus of claim 21, wherein the processing structure is further configured to update the calculated flight control device estimate signals at predetermined time intervals.

25. The apparatus of claim 21, wherein the flight control device is unmanned.

* * * * *

UNITED STATES PATENT AND TRADEMARK OFFICE
CERTIFICATE OF CORRECTION

PATENT NO. : 6,859,689 B2
DATED : February 22, 2005
INVENTOR(S) : David W. Vos

It is certified that error appears in the above-identified patent and that said Letters Patent is hereby corrected as shown below:

Column 19,
Line 19, "method at claim" should read -- method of claim --.
Line 52, "behavior, and" should read -- behavior; and --.

Signed and Sealed this

Tenth Day of May, 2005

JON W. DUDAS
*Director of the United States Patent and Trademark Office*